US012395562B2

(12) United States Patent
Bang et al.

(10) Patent No.: US 12,395,562 B2
(45) Date of Patent: Aug. 19, 2025

(54) WEARABLE DEVICE FOR TRANSMITTING INFORMATION AND METHOD THEREOF

(71) Applicant: SAMSUNG ELECTRONICS CO., LTD., Suwon-si (KR)

(72) Inventors: Jaewon Bang, Suwon-si (KR);
Donghyun Yeom, Suwon-si (KR);
Sanghun Lee, Suwon-si (KR);
Moonsoo Chang, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 18/237,260

(22) Filed: Aug. 23, 2023

(65) Prior Publication Data

US 2024/0155037 A1    May 9, 2024

Related U.S. Application Data

(63) Continuation of application No. PCT/KR2023/011272, filed on Aug. 1, 2023.

(30) Foreign Application Priority Data

Nov. 8, 2022  (KR) .................. 10-2022-0148263
Nov. 11, 2022 (KR) .................. 10-2022-0150393

(51) Int. Cl.
*H04W 4/02* (2018.01)
*A61B 5/01* (2006.01)
(Continued)

(52) U.S. Cl.
CPC ........... *H04L 67/303* (2013.01); *H04B 1/385* (2013.01); *H04L 67/141* (2013.01)

(58) Field of Classification Search
CPC ... H04L 67/303; H04L 67/141; H04L 67/306; H04B 1/385; G06F 1/16; G06F 3/00;
(Continued)

(56) References Cited

U.S. PATENT DOCUMENTS 9,871,546 B2 *  1/2018  Aoki ................... G06F 1/163
10,445,523 B2 * 10/2019  Clement ............... G06F 3/165
(Continued)

FOREIGN PATENT DOCUMENTS

KR       10-1095412 B1    12/2011
KR    10-2015-0033431 A    4/2015
(Continued)

OTHER PUBLICATIONS

International Search Report (PCT/ISA/210) issued on Nov. 20, 2023 by the International Searching Authority in International Patent Application No. PCT/KR2023/011272.
(Continued)

*Primary Examiner* — Chris Parry
*Assistant Examiner* — Hassan A Khan
(74) *Attorney, Agent, or Firm* — Sughrue Mion, PLLC

(57) ABSTRACT

Provided is a wearable device. The wearable device is configured to identify first profile information corresponding to an external electronic device. The wearable device is configured to request second profile information that is browsable by the user, from the external electronic device. The wearable device is configured to change the first profile information based on the first profile information and the second profile information received from the external electronic device. The wearable device is configured to display, through a display, at least a portion of the changed first profile information in the FoV.

16 Claims, 15 Drawing Sheets

(51) Int. Cl.
  *G06F 1/16* (2006.01)
  *G06F 3/0354* (2013.01)
  *G06F 21/31* (2013.01)
  *H04B 1/3827* (2015.01)
  *H04L 67/141* (2022.01)
  *H04L 67/303* (2022.01)
  *H04L 67/306* (2022.01)
  *H04W 4/021* (2018.01)
  *H04W 88/04* (2009.01)

(58) Field of Classification Search
  CPC ...... G06F 3/04842; G06F 15/16; G06F 17/30; G06F 21/31; G06F 3/0354; H04W 4/80; H04W 4/02; H04W 4/021; H04W 88/04; A61B 5/024; A61B 5/01; A61B 5/00; A61B 5/0205
  See application file for complete search history.

(56) References Cited

U.S. PATENT DOCUMENTS

| | | | |
|---|---|---|---|
| 10,706,600 B1* | 7/2020 | Yoon | G06F 3/011 |
| 10,719,989 B2 | 7/2020 | Stahl et al. | |
| 10,755,487 B1* | 8/2020 | Snibbe | G06V 20/20 |
| 10,768,790 B2 | 9/2020 | Schimke | |
| 10,817,066 B2* | 10/2020 | Ross | H04L 67/131 |
| 11,030,440 B2 | 6/2021 | Barnett | G06V 40/172 |
| 11,106,328 B1* | 8/2021 | Holland | G06F 3/0421 |
| 11,598,643 B2 | 3/2023 | Cowburn et al. | |
| 11,663,784 B2 | 5/2023 | Nigam et al. | |
| 11,809,629 B1* | 11/2023 | Segil | G06F 3/016 |
| 2011/0029889 A1* | 2/2011 | Karstens | A63F 13/35 715/745 |
| 2012/0092328 A1* | 4/2012 | Flaks | G06V 20/10 345/419 |
| 2012/0162255 A1* | 6/2012 | Ganapathy | A63F 13/12 345/633 |
| 2016/0012465 A1* | 1/2016 | Sharp | G06Q 20/321 705/14.17 |
| 2016/0035135 A1* | 2/2016 | Park | G02B 27/017 345/633 |
| 2016/0133052 A1* | 5/2016 | Choi | G06F 3/011 345/633 |
| 2016/0381536 A1* | 12/2016 | Li | G06Q 10/10 455/41.1 |
| 2017/0359456 A1* | 12/2017 | Shrubsole | G06F 3/017 |
| 2018/0020075 A1* | 1/2018 | Jung | H04L 67/306 |
| 2018/0267677 A1* | 9/2018 | Schimke | G06V 40/172 |
| 2018/0275860 A1* | 9/2018 | Dellinger | G06F 3/02 |
| 2019/0011979 A1* | 1/2019 | Faaborg | G06F 3/012 |
| 2019/0089456 A1* | 3/2019 | Kasilya Sudarsan | G11B 27/34 |
| 2020/0066044 A1* | 2/2020 | Stahl | G06V 20/20 |
| 2020/0265649 A1* | 8/2020 | Chaurasia | G06T 7/70 |
| 2020/0309558 A1* | 10/2020 | Cowburn | G06Q 30/0259 |
| 2021/0005224 A1* | 1/2021 | Rothschild | H04N 9/8205 |
| 2021/0008413 A1* | 1/2021 | Asikainen | G06F 3/0304 |
| 2021/0049348 A1* | 2/2021 | Qureshi | G06V 40/165 |
| 2021/0056761 A1* | 2/2021 | Nigam | G06F 3/04845 |
| 2021/0110058 A1* | 4/2021 | Glazberg | G06T 11/00 |
| 2021/0117712 A1* | 4/2021 | Huang | G10L 15/08 |
| 2021/0173480 A1* | 6/2021 | Osterhout | G06F 3/04815 |
| 2021/0358222 A1* | 11/2021 | Pejsa | G06F 3/0346 |
| 2022/0172239 A1* | 6/2022 | Smith | G06Q 30/0207 |
| 2022/0197394 A1* | 6/2022 | Ha | G06F 3/016 |
| 2022/0249837 A1* | 8/2022 | Madhuranthakam | A61N 1/36034 |
| 2022/0279048 A1* | 9/2022 | Goddard | G06Q 50/01 |
| 2022/0296966 A1* | 9/2022 | Asikainen | G16H 20/30 |
| 2022/0353599 A1* | 11/2022 | Chen | H04R 1/1016 |
| 2022/0366131 A1* | 11/2022 | Ekron | G06F 9/453 |
| 2022/0397988 A1* | 12/2022 | Whelan | G06F 3/04883 |
| 2023/0139739 A1* | 5/2023 | Brown | B60K 35/213 |
| 2023/0393397 A1* | 12/2023 | Daley | G02B 27/017 |
| 2023/0401873 A1* | 12/2023 | Moll | G06V 20/20 |
| 2024/0119423 A1* | 4/2024 | Sedouram | G06F 3/011 |

FOREIGN PATENT DOCUMENTS

| | | |
|---|---|---|
| KR | 10-2018-0007792 A | 1/2018 |
| KR | 10-2021-0023680 A | 3/2021 |
| KR | 10-2021-0143291 A | 11/2021 |
| KR | 10-2022-0075857 A | 6/2022 |
| WO | 2022/187281 A1 | 9/2022 |

OTHER PUBLICATIONS

Written Opinion (PCT/ISA/237) issued on Nov. 20, 2023 by the International Searching Authority in International Patent Application No. PCT/KR2023/011272.

* cited by examiner

WEARABLE DEVICE FOR TRANSMITTING
INFORMATION AND METHOD THEREOF

CROSS-REFERENCE TO RELATED
APPLICATIONS

This application is a bypass continuation of PCT International Application No. PCT/KR2023/011272, which was filed on Aug. 1, 2023, and claims priority to Korean Patent Application No. 10-2022-0148263, filed on Nov. 8, 2022, and Korean Patent Application No. 10-2022-0150393, filed on Nov. 11, 2022, in the Korean Intellectual Property Office, the disclosures of which are incorporated herein by reference in their entireties.

BACKGROUND

1. Field

The disclosure relates to a wearable device for transmitting information and a method thereof.

2. Description of Related Art

Various services are provided through a wearable device. The wearable device may operate by being worn on a portion of a user's body. The wearable device may identify an external electronic device included in a field-of-view (FoV) and may transmit the user's information to the external electronic device based on the user's state information. For example, the wearable device may identify the user's state information by using one or more sensors. The wearable device may change data to be transmitted to the external electronic device based on the identified user's biometric information.

SUMMARY

A wearable device according to an embodiment may comprise a communication circuit, a memory storing at least one instruction, a camera, a display and at least one processor. The at least one processor may be configured to execute the at least one instruction to establish, through the communication circuit, a communication link between the wearable device and an external electronic device, based on identifying the external electronic device in a field-of-view (FoV) corresponding to the camera and shown to a user wearing the wearable device. The at least one processor may be configured to execute the at least one instruction to identify first profile information corresponding to the external electronic device. The at least one processor may be configured to execute the at least one instruction to request, via the communication link, second profile information that is browsable by the user, from the external electronic device. The at least one processor may be configured to execute the at least one instruction to change the first profile information based on the first profile information and the second profile information received from the external electronic device. The at least one processor may be configured to execute the at least one instruction to display, through the display, at least a portion of the changed first profile information in the FoV.

A method of the wearable device according to an embodiment may comprise establishing communication link between the wearable device and an external electronic device, based on identifying the external electronic device in a field-of-view (FoV) corresponding to a camera of the wearable device and shown to a first user wearing the wearable device. The method may comprise transmitting, to the external electronic device, first profile information corresponding to a second user logged in to the external electronic device, based on a first state of the wearable device in which the communication link is established. The method may comprise identifying a change in a state of the first user, based on one or more sensors. The method may comprise storing in a memory, state information indicating whether to update the first profile information, based on the change in the state of first user.

A wearable device according to an embodiment may include a communication circuit, one or more sensors, a memory storing at least one instruction, a camera, a display and a processor. The at least one processor may be configured to execute the at least one instruction to establish, through the communication circuit, a communication link between the wearable device and an external electronic device, based on identifying the external electronic device in a field-of-view (FoV) corresponding to the camera and shown to a first user wearing the wearable device. The at least one processor may be configured to execute the at least one instruction to transmit, to the external electronic device, first profile information corresponding to a second user logged in to the external electronic device, based on a first state of the wearable device in which the communication link is established. The at least one processor may be configured to execute the at least one instruction to identify a change in the state of the first user, based on the one or more sensors. The at least one processor may be configured to execute the at least one instruction to store, in the memory, state information indicating whether to update the first profile information based on the change in the state of the first user.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
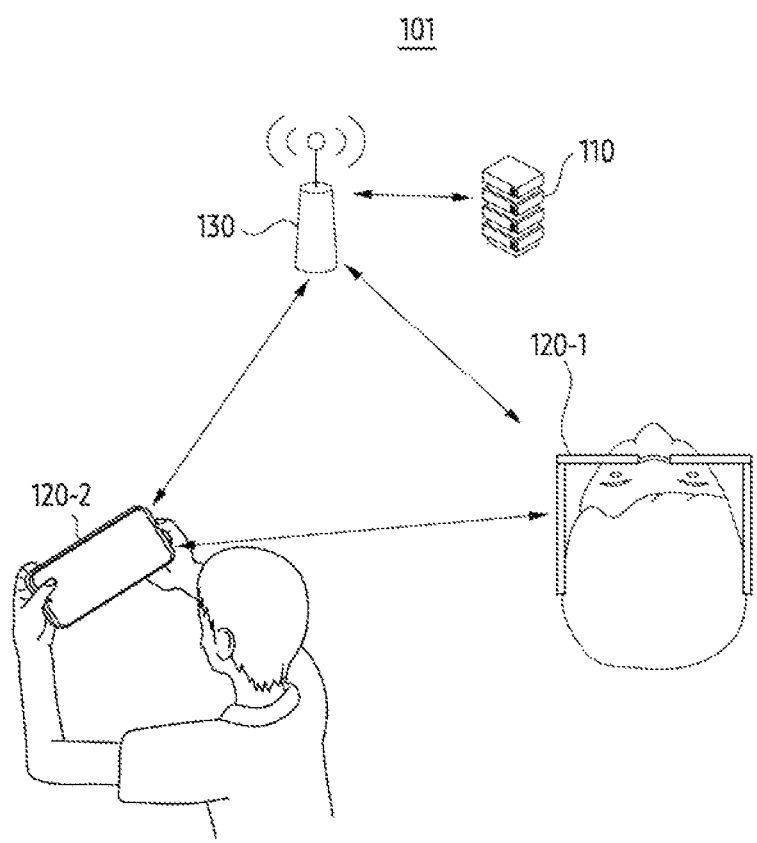
FIG. 1 is an exemplary diagram of a first embodiment environment in which a metaverse service is provided through a server.

Hereinafter, embodiments of the present disclosure will be described in detail with reference to the accompanying drawings, where similar reference characters denote corresponding features consistently throughout.

It should be appreciated that various example embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Metaverse is a compound word of the English word 'Meta', which means 'virtual' and 'transcendence', and 'Universe', which means the universe, and refers to a three-dimensional virtual world where social, economic, and cultural activities such as the real world take place. The metaverse is a concept that has evolved one step further than virtual reality (VR, state-of-the-art technology that allows people to experience the same as real life in a virtual world generated by a computer), and is characterized by using avatars to not only enjoy games or virtual reality but also social and cultural activities like real life.

Such a metaverse service may be provided in at least two forms. The first is to provide services to a user by using a server, and the second is to provide services through individual contacts between users.

FIG. 1 is an exemplary diagram of a first embodiment environment 101 in which a metaverse service is provided through a server 110.

Referring to FIG. 1, the first embodiment environment 101 is configured with a server 110 that provides the metaverse service, a network (e.g., a network formed by at least one intermediate node 130 including an access point (AP), and/or a base station) that connects the server 110 and each user terminal (e.g., a user terminal 120 including a first terminal 120-1 and a second terminal 120-2), and a user terminal that allows a user to use the service by inputting/outputting to/from the metaverse service by connecting to a server through a network.

In this case, the server 110 provides a virtual space so that the user terminal 120 may perform activities in the virtual space. In addition, the user terminal 120 expresses information provided to the user by the server 110 by installing a S/W agent for accessing the virtual space provided by the server 110, or transmits information that the user wants to express in the virtual space to the server.

The S/W agent may be provided directly through the server 110, or may be provided by being downloaded from a public server, or by being embedded when purchasing a terminal.

Figure 2:
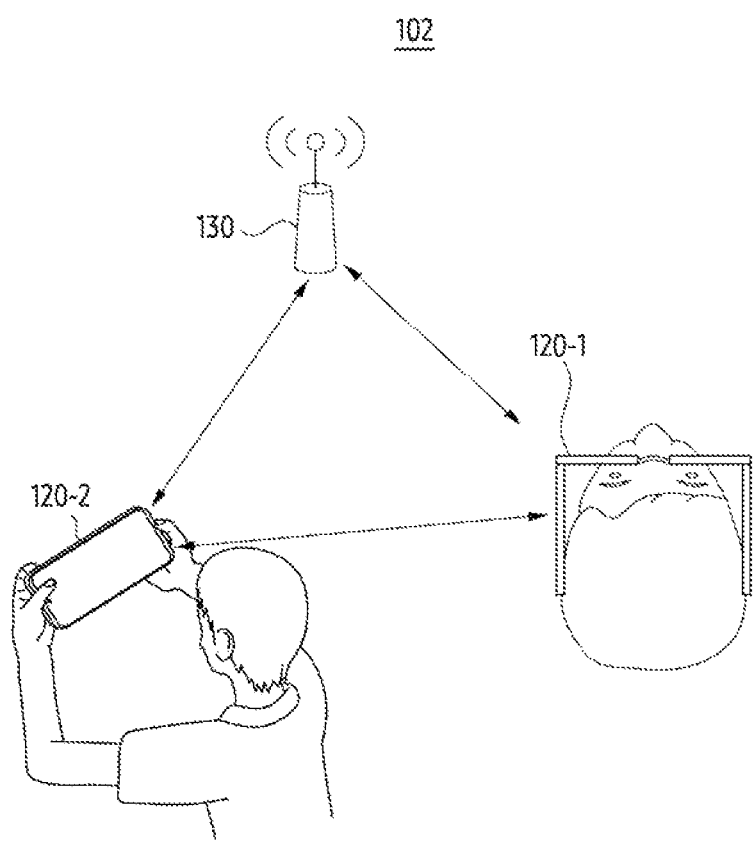
FIG. 2 is an exemplary diagram of a second embodiment environment in which a metaverse service is provided through a direct connection of user terminals.

FIG. 2 is an exemplary diagram of a second embodiment environment 102 in which a metaverse service is provided through a direct connection of user terminals (e.g., a first terminal 120-1 and a second terminal 120-2).

Referring to FIG. 2, the second embodiment environment 102 is configured with the first terminal 120-1 that provides the metaverse service, a network (e.g., a network formed by at least one intermediate node 130) that connects each user terminal, and the second terminal 120-2 that allows a second user to use the service by inputting/outputting to/from the metaverse service by connecting to the first terminal 120-1 through the network.

The second embodiment is characterized in that the metaverse service is provided by the first terminal 120-1 performing the role of the server (e.g., a server 110 of FIG. 1) in a first embodiment. In other words, it may be seen that the metaverse environment may be configured only by the connection between the device and the device.

In the first and second embodiments, the user terminal 120 (or the user terminal 120 including the first terminal 120-1 and the second terminal 120-2) may be made in various form factors, and is characterized by including an output device for providing video or/and sound to the user and an input device for inputting information to the metaverse service. Examples of the various form factors of the user terminal 120 may include a smartphone (e.g., the second terminal 120-2), an AR device (e.g., the first terminal 120-1), a virtual reality (VR) device, a mixed reality (MR) device, a video see through (VST) device, a TV or a projector capable of input/output.

The network (e.g., a network formed by the at least one intermediate node 130) of the present invention includes all various broadband networks including 3G, 4G and 5G, and a local area network (e.g., a wired network or a wireless network directly connecting the first terminal 120-1 and the second terminal 120-2) including wireless fidelity (WiFi) and bluetooth (BT).

Figure 3A:
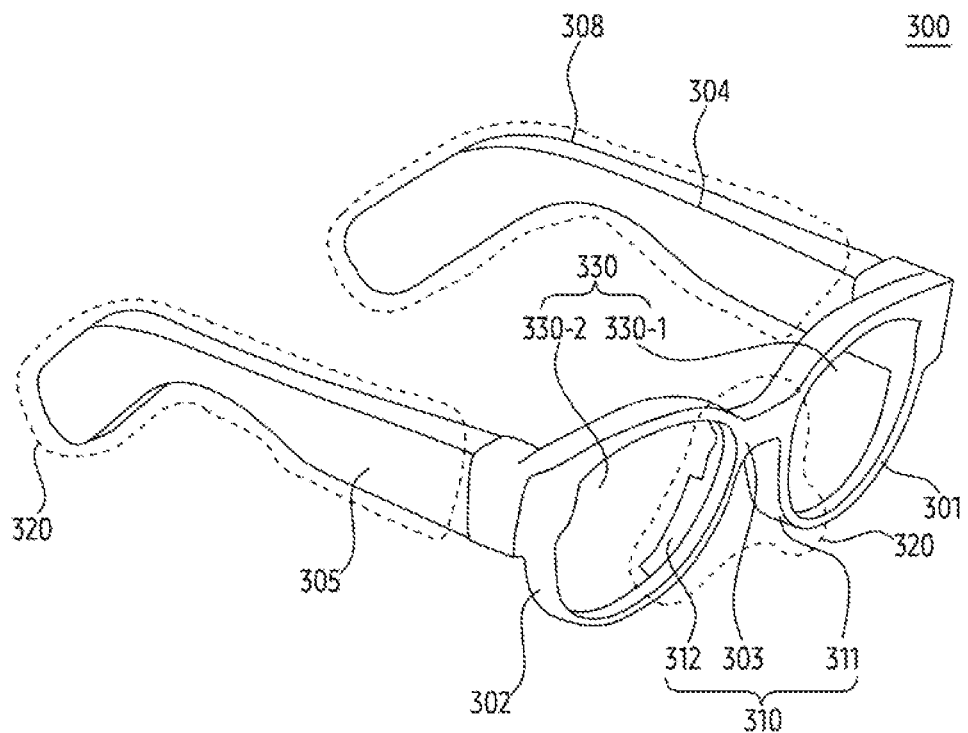
FIG. 3A illustrates a perspective view of a wearable device according to an embodiment.
Figure 3B:
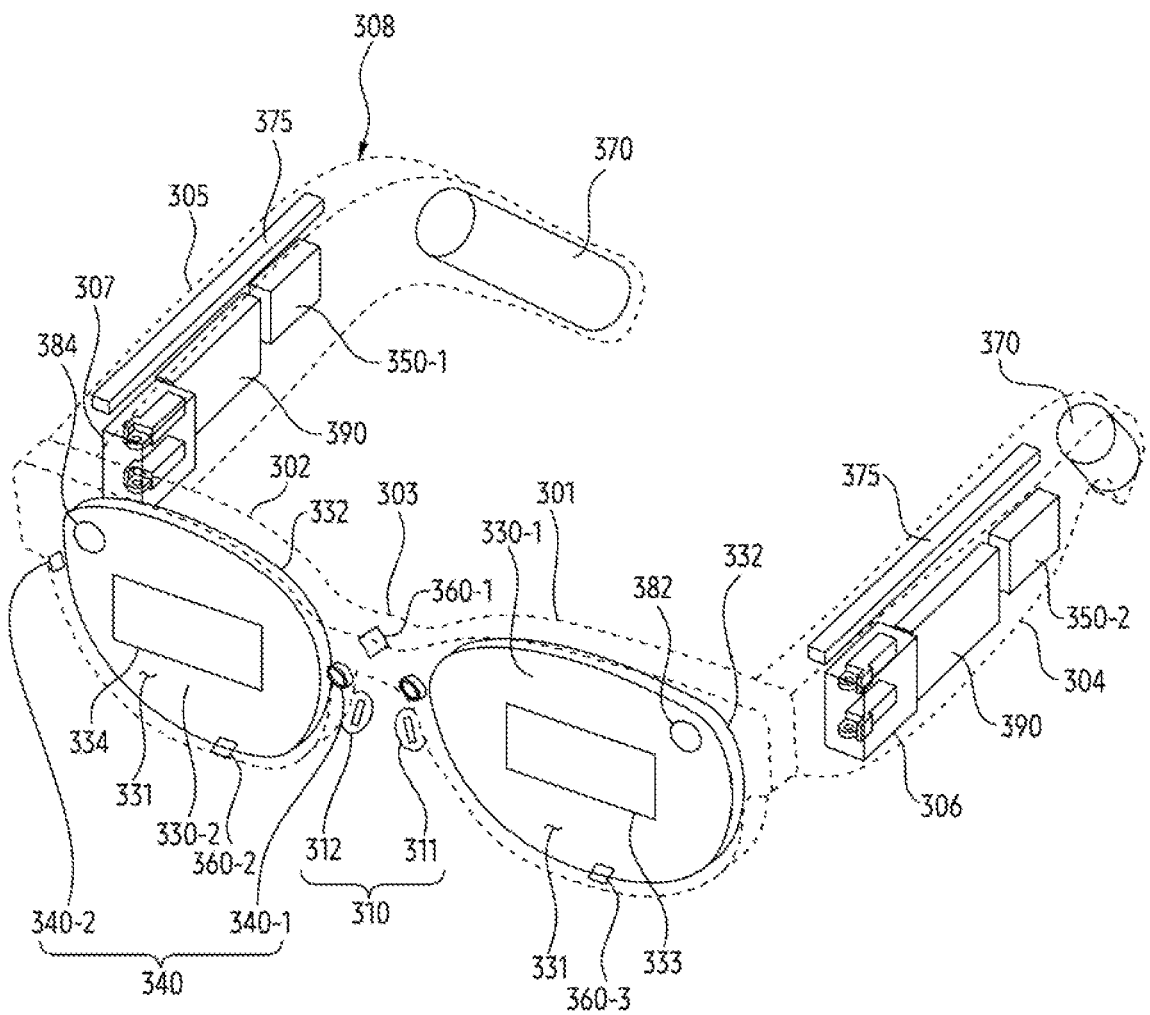
FIG. 3B illustrates hardware disposed in a wearable device according to an embodiment.

FIG. 3A illustrates a perspective view of a wearable device according to an embodiment. FIG. 3B illustrates hardware disposed in a wearable device according to an embodiment. A wearable device 300 of FIGS. 3A to 3B may be an example of a user terminal 120 of FIGS. 1 and 2.

Referring to FIG. 3A, the wearable device 300 according to an embodiment may include at least one display 330 and a frame 308 supporting the at least one display 330. According to an embodiment, the wearable device 300 may have a form of glasses that may be wearable on the user's body part (e.g., head). The wearable device 300 may include a head-mounted display (HMD). For example, a housing of the wearable device 300 may include a flexible material such as rubber and/or silicone having a form that closely adheres to a portion of the user's head (e.g., a portion of the face surrounding both eyes). For example, the housing of the wearable device 300 may include one or more straps that is able to be twined around the user's head, and/or one or more temples attachable to the ears of the head.

According to an embodiment, the wearable device 300 may be wearable on a portion of the user's body. The wearable device 300 may provide augmented reality (AR), virtual reality (VR), or mixed reality (MR) combining the augmented reality and the virtual reality to a user wearing the wearable device 300. For example, the wearable device 300 may display a virtual reality image provided by at least one optical device 382 and 384 of FIG. 3B on the at least one display 330 in response to a user's designated gesture obtained through a motion recognition camera 340-2 of FIG. 3B.

According to an embodiment, the at least one display 330 may provide visual information to a user. For example, the at least one display 330 may include a transparent or translucent lens. The at least one display 330 may include a first display 330-1 and/or a second display 330-2 spaced apart from the first display 330-1. For example, the first display 330-1 and the second display 330-2 may be disposed at positions corresponding to the user's left and right eyes, respectively.

Referring to FIG. 3B, the at least one display 330 may provide the visual information transmitted from external light and other visual information distinct from the visual information to the user through a lens included in the at least one display 330. The lens may be formed based on at least one of a fresnel lens, a pancake lens, or a multi-channel lens. For example, the at least one display 330 may include a first surface 331 and a second surface 332 opposite to the first surface 331. A display area may be formed on the second surface 332 of the at least one display 330. When the user wears the wearable device 300, the external light may be transmitted to the user by being incident on the first surface 331 and being penetrated through the second surface 332. For another example, the at least one display 330 may display an augmented reality image in which a virtual reality image provided from the at least one optical device 382 and 384 is combined with a reality screen transmitted through the external light, on the display area formed on the second surface 332.

In an embodiment, the at least one display 330 may include at least one waveguide 333 and 334 that diffracts light transmitted from the at least one optical device 382 and 384 and transmits it to the user. The at least one waveguide 333 and 334 may be formed based on at least one of glass, plastic, or polymer. A nano pattern may be formed on at least a portion of the outside or inside of the at least one waveguide 333 and 334. The nano pattern may be formed based on a grating structure having a polygonal or curved shape. Light incident on one end of the at least one waveguide 333 and 334 may be propagated to the other end of the at least one waveguide 333 and 334 by the nano pattern. The at least one waveguide 333 and 334 may include at least one of at least one diffraction element (e.g., a diffractive optical element (DOE), a holographic optical element (HOE)), and a reflection element (e.g., a reflection mirror). For example, the at least one waveguide 333 and 334 may be disposed in the wearable device 300 to guide a screen displayed by the at least one display 330 to the user's eyes. For example, the screen may be transmitted to the user's eyes based on total internal reflection (TIR) generated in the at least one waveguide 333 and 334.

According to an embodiment, the wearable device 300 may analyze an object included in a real image collected through a photographing camera, combine virtual object corresponding to an object that become a subject of augmented reality provision among the analyzed object, and display them on the at least one display 330. The virtual object may include at least one of text and images for various information associated with the object included in the real image. The wearable device 300 may analyze the object based on a multi-camera such as a stereo camera. For the object analysis, the wearable device 300 may execute time-of-flight (ToF) and/or simultaneous localization and mapping (SLAM) supported by the multi-camera. The user wearing the wearable device 300 may watch an image displayed on the at least one display 330.

According to an embodiment, the frame 308 may be configured with a physical structure in which the wearable device 300 may be worn on the user's body. According to an embodiment, the frame 308 may be configured so that when the user wears the wearable device 300, the first display 330-1 and the second display 330-2 may be positioned corresponding to the user's left and right eyes. The frame 308 may support the at least one display 330. For example, the frame 308 may support the first display 330-1 and the second display 330-2 to be positioned at positions corresponding to the user's left and right eyes.

Referring to FIG. 3A, the frame 308 according to an embodiment may include an area 320 at least partially in contact with the portion of the user's body in case that the user wears the wearable device 300. For example, the area 320 in contact with the portion of the user's body of the frame 308 may include an area contacting a portion of the user's nose, a portion of the user's ear, and a portion of the side of the user's face that the wearable device 300 contacts. According to an embodiment, the frame 308 may include a nose pad 310 that is contacted on the portion of the user's body. When the wearable device 300 is worn by the user, the nose pad 310 may be contacted on the portion of the user's nose. The frame 308 may include a first temple 304 and a second temple 305 that is contacted on another portion of the user's body that is distinct from the portion of the user's body.

For example, the frame 308 may include a first rim 301 surrounding at least a portion of the first display 330-1, a second rim 302 surrounding at least a portion of the second display 330-2, a bridge 303 disposed between the first rim 301 and the second rim 302, a first pad 311 disposed along a portion of the edge of the first rim 301 from one end of the bridge 303, a second pad 312 disposed along a portion of the edge of the second rim 302 from the other end of the bridge 303, the first temple 304 extending from the first rim 301 and fixed to a portion of the wearer's ear, and the second temple 305 extending from the second rim 302 and fixed to a portion of the ear opposite to the ear. The first pad 311 and the second pad 312 may be in contact with the portion of the user's nose, and the first temple 304 and the second temple 305 may be in contact with a portion of the user's face and the portion of the user's ear. The temples 304 and 305 may be rotatably connected to the rim through hinge units 306 and 307 of FIG. 3B. The first temple 304 may be rotatably connected with respect to the first rim 301 through the first hinge unit 306 disposed between the first rim 301 and the first temple 304. The second temple 305 may be rotatably connected with respect to the second rim 302 through the second hinge unit 307 disposed between the second rim 302 and the second temple 305. According to an embodiment, the wearable device 300 may identify an external object (e.g., a user's fingertip) touching the frame 308 and/or a gesture performed by the external object by using a touch sensor, a grip sensor, and/or a proximity sensor formed on at least a portion of the surface of the frame 308.

According to an embodiment, the wearable device 300 may include hardware (e.g., hardware described above based on the block diagram of FIG. 2) that performs various functions. For example, the hardware may include a battery module 370, an antenna module 375, the at least one optical device 382 and 384, a speaker 350, a microphone 360, a light emitting module, and/or a printed circuit board 390. Various hardware may be disposed in the frame 308.

According to an embodiment, the microphone 360 of the wearable device 300 may obtain a sound signal, by being disposed on at least a portion of the frame 308. A first microphone 360-1 disposed on the nose pad 310, a second microphone 360-2 disposed on the second rim 302, and a third microphone 360-3 disposed on the first rim 301 are illustrated in FIG. 3B, but the number and disposition of the microphone 360 are not limited to an embodiment of FIG. 3B. In case that the number of the microphones 360 included in the wearable device 300 is two or more, the wearable device 300 may identify the direction of the sound signal by using a plurality of microphones disposed on different portions of the frame 308.

According to an embodiment, the at least one optical device 382 and 384 may project the virtual object on the at least one display 330 in order to provide various image information to the user. For example, the at least one optical device 382 and 384 may be a projector. The at least one optical device 382 and 384 may be disposed adjacent to the at least one display 330 or may be included in the at least one display 330 as portion of the at least one display 330. According to an embodiment, the wearable device 300 may include a first optical device 382 corresponding to the first display 330-1 and a second optical device 384 corresponding to the second display 330-2. For example, the at least one optical device 382 and 384 may include the first optical device 382 disposed at the edge of the first display 330-1 and the second optical device 384 disposed at the edge of the second display 330-2. The first optical device 382 may transmit light to the first waveguide 333 disposed on the first display 330-1, and the second optical device 384 may transmit light to the second waveguide 334 disposed on the second display 330-2.

In an embodiment, a camera 340 may include the photographing camera, an eye tracking camera (ET CAM) 340-1, and/or the motion recognition camera 340-2. The photographing camera, the eye tracking camera 340-1, and the motion recognition camera 340-2 may be disposed at different positions on the frame 308 and may perform different functions. The eye tracking camera 340-1 may output data indicating the gaze of the user wearing the wearable device 300. For example, the wearable device 300 may detect the gaze from an image including the user's pupil obtained through the eye tracking camera 340-1. An example in which the eye tracking camera 340-1 is disposed toward the user's right eye is illustrated in FIG. 3B, but the embodiment is not limited thereto, and the eye tracking camera 340-1 may be disposed alone toward the user's left eye or may be disposed toward both eyes.

In an embodiment, the photographing camera may photograph a real image or background to be matched with a virtual image in order to implement the augmented reality or mixed reality content. The photographing camera may photograph an image of a specific object existing at a position viewed by the user and provide the image to the at least one display 330. The at least one display 330 may display one image in which a virtual image provided through the optical device 382 and 384 is overlapped with information on the real image or background including an image of the specific object obtained by using the photographing camera. In an embodiment, the photographing camera may be disposed on the bridge 303 disposed between the first rim 301 and the second rim 302.

In an embodiment, the eye tracking camera 340-1 may implement a more realistic augmented reality by matching the user's gaze with the visual information provided on the at least one display 330 by tracking the gaze of the user wearing the wearable device 300. For example, when the user looks at the front, the wearable device 300 may naturally display environment information associated with the user's front on the at least one display 330 at the position where the user is positioned. The eye tracking camera 340-1 may be configured to capture an image of the user's pupil in order to determine the user's gaze. For example, the eye tracking camera 340-1 may receive gaze detection light reflected from the user's pupil and may track the user's gaze based on the position and movement of the received gaze detection light. In an embodiment, the eye tracking camera 340-1 may be disposed at a position corresponding to the user's left and right eyes. For example, the eye tracking camera 340-1 may be disposed in the first rim 301 and/or the second rim 302 to face the direction in which the user wearing the wearable device 300 is positioned.

In an embodiment, the motion recognition camera 340-2 may provide a specific event to the screen provided on the at least one display 330 by recognizing the movement of the whole or portion of the user's body, such as the user's torso, hand, or face. The motion recognition camera 340-2 may obtain a signal corresponding to the gesture by recognizing the user's gesture, and may provide a display corresponding to the signal to the at least one display 330. The processor may identify a signal corresponding to the operation and may perform a designated function based on the identification. In an embodiment, the motion recognition camera 340-2 may be disposed on the first rim 301 and/or the second rim 302.

In an embodiment, the camera 340 included in the wearable device 300 is not limited to the above-described eye tracking camera 340-1 and the motion recognition camera 340-2. For example, the wearable device 300 may identify an external object included in the FoV by using the camera 340 disposed toward the user's FoV. That the wearable device 300 identifies the external object may be performed based on a sensor for identifying a distance between the wearable device 300 and the external object, such as a depth sensor and/or a time of flight (ToF) sensor. The camera 340 disposed toward the FoV may support an autofocus function and/or an optical image stabilization (OIS) function. For example, the wearable device 300 may include the camera 340 (e.g., a face tracking (FT) camera) disposed toward the face in order to obtain an image including the face of the user wearing the wearable device 300.

the wearable device 300 according to an embodiment may further include a light source (e.g., LED) that emits light toward a subject (e.g., the user's eyes, face, and/or the external object in the FoV) photographed by using the camera 340. The light source may include an LED having an infrared wavelength. The light source may be disposed on at least one of the frame 308, and the hinge units 306 and 307.

According to an embodiment, the battery module 370 may supply power to electronic components of the wearable device 300. In an embodiment, the battery module 370 may be disposed in the first temple 304 and/or the second temple 305. For example, the battery module 370 may be a plurality of battery modules 370. The plurality of battery modules 370 may be disposed on each of the first temple 304 and the second temple 305. In an embodiment, the battery module 370 may be disposed at an end of the first temple 304 and/or the second temple 305.

In an embodiment, the antenna module 375 may transmit the signal or power to the outside of the wearable device 300 or may receive the signal or power from the outside. The antenna module 375 may be electronically and/or operably connected to the communication circuit 540 of FIG. 5A to be described later. In an embodiment, the antenna module 375 may be disposed in the first temple 304 and/or the second temple 305. For example, the antenna module 375 may be disposed close to one surface of the first temple 304 and/or the second temple 305.

In an embodiment, the speaker 350 may output a sound signal to the outside of the wearable device 300. A sound output module may be referred to as a speaker. In an embodiment, the speaker 350 may be disposed in the first temple 304 and/or the second temple 305 in order to be disposed adjacent to the ear of the user wearing the wearable device 300. For example, the speaker 350 may include a second speaker 350-2 disposed adjacent to the user's left ear by being disposed in the first temple 304, and a first speaker 350-1 disposed adjacent to the user's right ear by being disposed in the second temple 305.

In an embodiment, the light emitting module may include at least one light emitting element. The light emitting module may emit light of a color corresponding to a specific state or may emit light through an operation corresponding to the specific state in order to visually provide information on a specific state of the wearable device 300 to the user. For example, in case that the wearable device 300 needs charging, it may repeatedly emit red light at a designated timing. In an embodiment, the light emitting module may be disposed on the first rim 301 and/or the second rim 302.

Referring to FIG. 3B, according to an embodiment, the wearable device 300 may include the printed circuit board (PCB) 390. The PCB 390 may be included in at least one of the first temple 304 and the second temple 305. The PCB 390 may include an interposer disposed between at least two sub PCBs. On the PCB 390, one or more hardware included in the wearable device 300 may be disposed. The wearable device 300 may include a flexible PCB (FPCB) for interconnecting the hardware.

According to an embodiment, the wearable device 300 may include at least one of a gyro sensor, a gravity sensor, and/or an acceleration sensor for detecting the posture of the wearable device 300 and/or the posture of a body part (e.g., a head) of the user wearing the wearable device 300. Each of the gravity sensor and the acceleration sensor may measure gravity acceleration, and/or acceleration based on designated three-dimensional axes (e.g., x-axis, y-axis, and z-axis) perpendicular to each other. The gyro sensor may measure angular velocity of each of designated three-dimensional axes (e.g., x-axis, y-axis, and z-axis). At least one of the gravity sensor, the acceleration sensor, and the gyro sensor may be referred to as an inertial measurement unit (IMU). According to an embodiment, the wearable device 300 may identify the user's motion and/or gesture performed to execute or stop a specific function of the wearable device 300 based on the IMU.

Figure 4A:
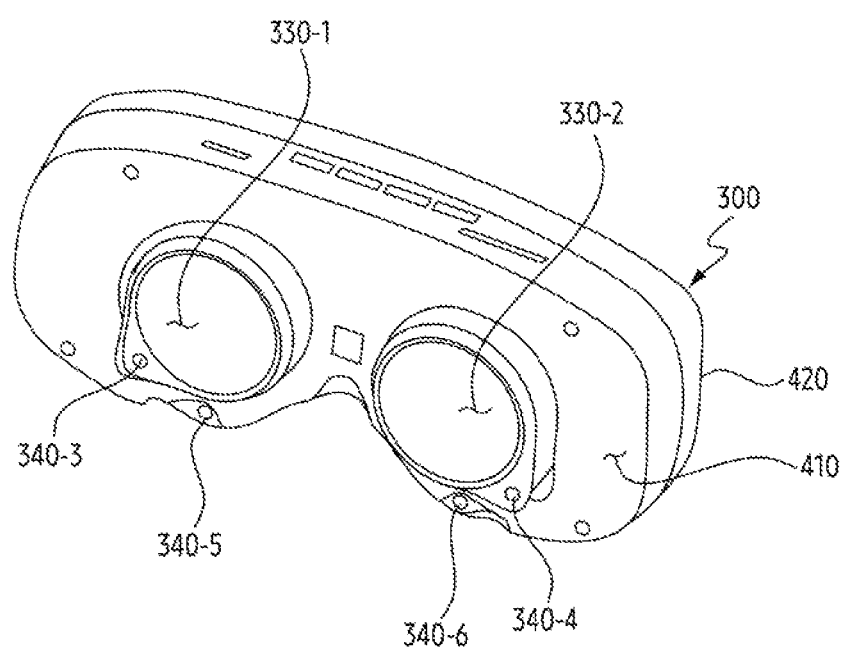
FIGS. 4A and 4B illustrate a wearable device according to an embodiment.
Figure 4B:
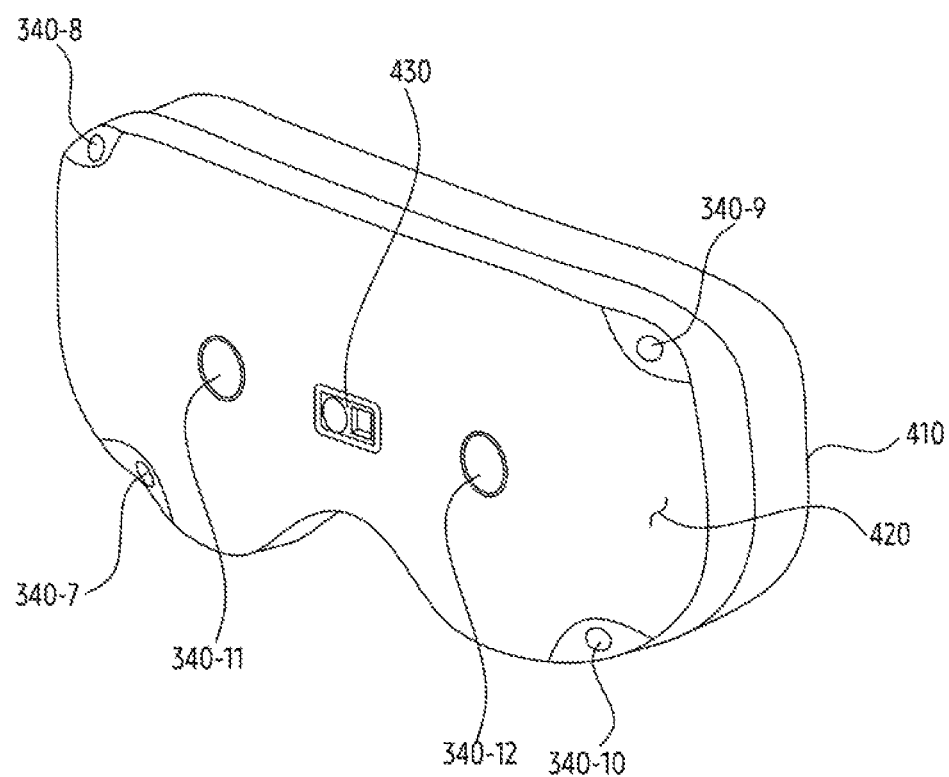

FIGS. 4A and 4B illustrate a wearable device according to an embodiment.

The wearable device 300 of FIGS. 4A to 4B may be an example of a user terminal 120 of FIGS. 1 and 2. According to an embodiment, an example of an appearance of a first surface 410 of the housing of the wearable device 300 may be illustrated in FIG. 4A, and an example of an appearance of a second surface 420 opposite to the first surface 410 may be illustrated in FIG. 4B.

Referring to FIG. 4A, according to an embodiment, the first surface 410 of the wearable device 300 may have an attachable shape on the user's body part (e.g., the user's face). the wearable device 300 may further include a strap for being fixed on the user's body part, and/or one or more temples (e.g., a first temple 304 and/or a second temple 305 of FIGS. 3A to 3B). A first display 330-1 for outputting an image to the left eye among the user's both eyes and a second display 330-2 for outputting an image to the right eye among the user's both eyes may be disposed on the first surface 410. The wearable device 300 may be formed on the first surface 410 and may further include rubber or silicon packing for preventing interference by light (e.g., ambient light) different from the light emitted from the first display 330-1 and the second display 330-2.

According to an embodiment, the wearable device 300 may include cameras 340-3 and 340-4 for photographing and/or tracking both eyes of the user adjacent to each of the first display 330-1 and the second display 330-2. The cameras 340-3 and 340-4 may be referred to as ET cameras. According to an embodiment, the wearable device 300 may include cameras 340-5 and 340-6 for photographing and/or recognizing the user's face. The cameras 340-5 and 340-6 may be referred to as FT cameras.

Referring to FIG. 4B, a camera (e.g., cameras 340-7, 340-8, 340-9, 340-10, 340-11, and 340-12), and/or a sensor (e.g., a depth sensor 430) for obtaining information associated with the external environment of the wearable device 300 may be disposed on the second surface 420 opposite to the first surface 410 of FIG. 4A. For example, the cameras 340-7, 340-8, 340-9, and 340-10 may be disposed on the second surface 420 in order to recognize an external object different from the wearable device 300. For example, by using cameras 340-11 and 340-12, the wearable device 300 may obtain an image and/or video to be transmitted to each of the user's both eyes. The camera 340-11 may be disposed on the second surface 420 of the wearable device 300 to obtain an image to be displayed through the second display 330-2 corresponding to the right eye among the both eyes. The camera 340-12 may be disposed on the second surface 420 of the wearable device 300 to obtain an image to be displayed through the first display 330-1 corresponding to the left eye among the both eyes.

According to an embodiment, the wearable device 300 may include the depth sensor 430 disposed on the second surface 420 in order to identify a distance between the wearable device 300 and the external object. By using the depth sensor 430, the wearable device 300 may obtain spatial information (e.g., a depth map) about at least a portion of the FoV of the user wearing the wearable device 300.

Although not illustrated, a microphone (e.g., a microphone 360 of FIG. 2) for obtaining sound outputted from the external object may be disposed on the second surface 420 of the wearable device 300. The number of microphones may be one or more according to embodiments.

Figure 5A:
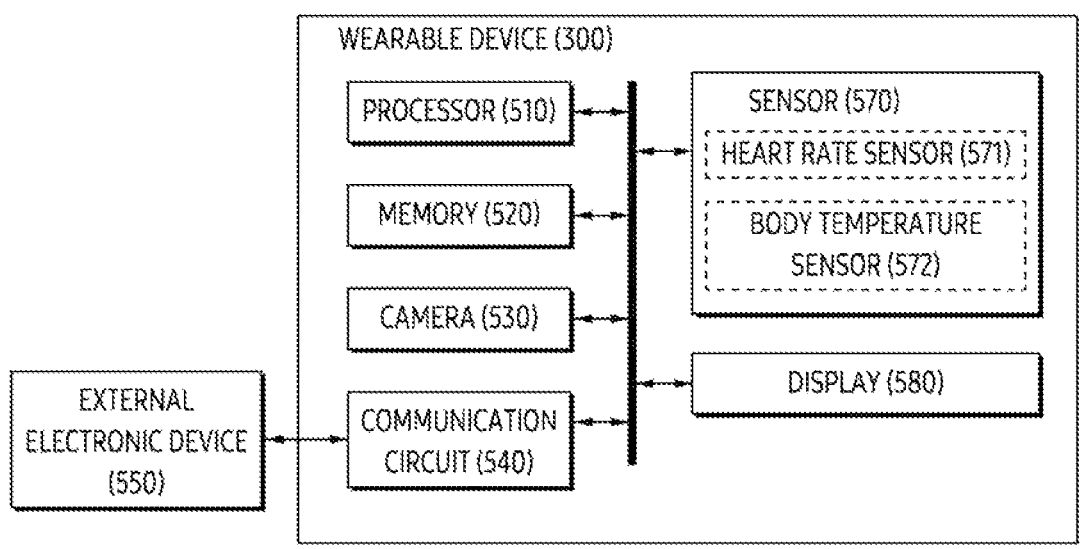
FIG. 5A is a block diagram of a wearable device according to an embodiment.
Figure 5B:
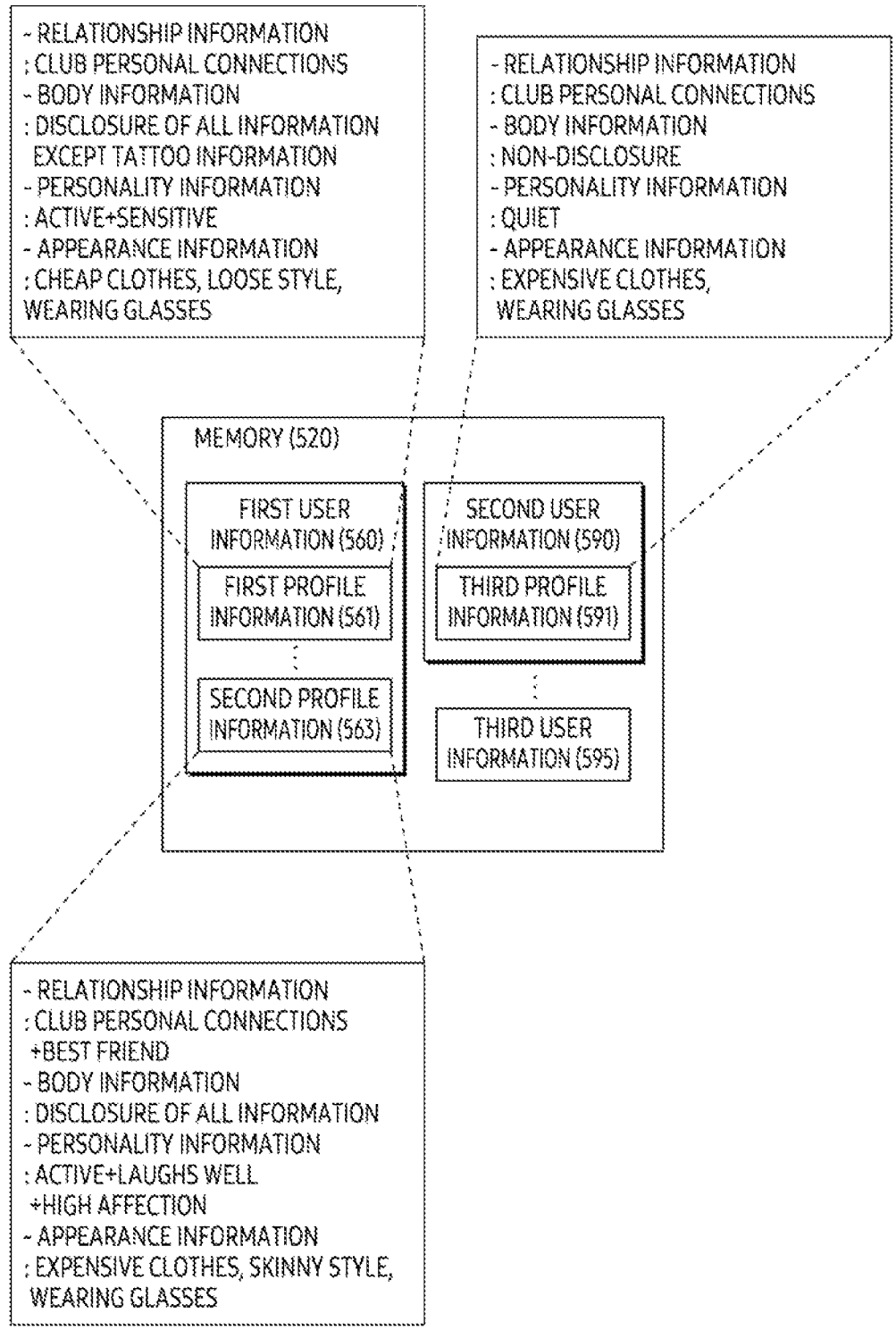
FIG. 5B is a block diagram of a processor of a wearable device according to an embodiment.

FIG. 5A is a block diagram of a wearable device according to an embodiment. FIG. 5B is a block diagram of a processor of a wearable device according to an embodiment. A wearable device 300 of FIG. 5A may include a user terminal 120 of FIG. 1.

Referring to FIG. 5A, the wearable device 300 may include at least one of a processor 510, a memory 520, a camera 530, a communication circuit 540, a sensor 570, or a display 580. The processor 510, the memory 520, the camera 530, the communication circuit 540, the sensor 570, and the display 580 may be electronically and/or operably coupled with each other by an electronic component such as a communication bus. That the hardware operably coupled with each other may mean that a direct connection or an indirect connection between hardware is established by wire or wirelessly so that specific hardware is controlled by other hardware, and/or the other hardware is controlled by the specific hardware among the hardware. The type and/or number of hardware included in the wearable device 300 is not limited to an example of FIG. 5.

According to an embodiment, the processor 510 of the wearable device 300 may include the hardware component for processing data based on one or more instructions. The hardware component for processing data may include, for example, an arithmetic and logic unit (ALU), a floating point unit (FPU), a field programmable gate array (FPGA), and/or a central processing unit (CPU). The number of processors 510 may be one or more. For example, the processor 510 may have a structure of a multi-core processor such as a dual core, a quad core, or a hexa core.

According to an embodiment, the memory 520 of the wearable device 300 may include the hardware component for storing data and/or instructions inputted to the processor 510 or outputted from the processor 510. The memory 520 may include, for example, volatile memory such as random-access memory (RAM), and/or non-volatile memory such as read-only memory (ROM). The volatile memory may include, for example, at least one of dynamic RAM (DRAM), static RAM (SRAM), Cache RAM, and pseudo SRAM (PSRAM). The non-volatile memory may include, for example, at least one of a programmable ROM (PROM), an erasable PROM (EPROM), an electrically erasable PROM (EEPROM), a flash memory, a hard disk, a compact disk, and an embedded multi media card (eMMC).

In the memory 520, one or more instructions indicating the calculation and/or operation to be performed by the processor 510 on data may be stored. A set of one or more instructions may be referred to as firmware, operating system, process, routine, sub-routine and/or application. For example, the wearable device 300 and/or the processor 510 may perform at least one of the operations of FIG. 7, FIG. 9, and FIG. 10 when a set of a plurality of instructions distributed in the form of the operating system, the firmware, driver, and/or the application is executed. Hereinafter, that the application is installed in the wearable device 300 means that the one or more instructions provided in the form of the application are stored in the memory 520 of the wearable device 300, and the one or more applications are stored in an executable format (e.g., a file having an extension designated by the operating system of the wearable device 300) by the processor 510 of the wearable device 300.

According to an embodiment, the camera 530 of the wearable device 300 may include one or more light sensors (e.g., a charged coupled device (CCD) sensor and a complementary metal oxide semiconductor (CMOS) sensor) that generate an electrical signal indicating the color and/or brightness of light. A plurality of light sensors included in the camera 530 may be disposed in the form of a 2 dimensional array. The camera 530 may generate an image that corresponds to the light reaching the light sensors of the 2 dimensional array and includes a plurality of pixels arranged in 2 dimensions, by obtaining the electrical signal of each of the plurality of light sensors substantially simultaneously. For example, photo data captured using the camera 530 may mean one image obtained from the camera 530. For example, video data captured using the camera 530 may mean a sequence of a plurality of images obtained along a designated frame rate from the camera 530. The wearable device 300 according to an embodiment is disposed toward the direction in which the camera 530 receives light, and may further include a flash light for outputting light in the direction. The number of cameras 530 included in the wearable device 300 may be one or more.

In an embodiment, the FoV of the camera 530 is an area in which the lens of the camera 530 is formed based on a view angle capable of receiving light, and may correspond to an area corresponding to an image generated by the camera 530. Hereinafter, a subject and/or an external object means an object included in the FoV of the camera 530 and distinct from the wearable device 300. In an embodiment, the FoV of the camera 530 may at least partially match the environment shown to the user through the display 580, like the FoV 607 of FIG. 6.

According to an embodiment, the communication circuit 540 of the wearable device 300 may include hardware for supporting transmission and/or reception of the electrical signal between the wearable device 300 and an external electronic device 550. The communication circuit 540 may include, for example, at least one of a modem (MODEM), an antenna, and an optic/electronic (O/E) converter. The communication circuit 540 may support transmission and/or reception of the electrical signal based on various types of protocols, such as ethernet, local area network (LAN), wide area network (WAN), wireless fidelity (WiFi), Bluetooth, bluetooth low energy (BLE), ZigBee, long term evolution (LTE), and 5G new radio (NR). The wearable device 300 may establish a communication link with the external electronic device 550 by using the communication circuit 540 based on identifying the external electronic device 550 in the FoV of the wearable device 300. According to an embodiment, the operation performed by the wearable device 300 based on communication between the external electronic device 550 and the wearable device 300 is described with reference to FIG. 6.

The sensor 570 of the wearable device 300 according to an embodiment may generate electrical information that may be processed by the processor 510 and/or a memory from non-electronic information associated with the wearable device 300. The electrical information generated by the sensor 570 may be stored in the memory 520, may be processed by the processor 510, and/or may be transmitted to another electronic device distinct from the wearable device 300.

According to an embodiment, the number of sensors 570 of the wearable device 300 may be one or more. For example, the sensor 570 may include at least one of a heart rate sensor 571 and a body temperature sensor 572.

For example, the heart rate sensor 571 (e.g., a photoplethysmogram (PPG) sensor) may be used to measure a pulse (or a change in the amount of blood in the blood vessel) by identifying the amount of change in the amount of photo-sensitization according to the change in blood vessel volume. For example, the processor 510 may identify a change in a state of the user wearing the wearable device 300 based on data obtained through the heartbeat sensor 571. For example, the processor 510 may identify a change in the state of the user wearing the wearable device 300 based on data obtained through the heartbeat sensor 571. For example, the heart rate sensor 571 may be used to identify information on the user's heart rate change, information on the user's stress based on heart rate variability (HRV), information on the user's breathing rate, and information on the user's blood pressure.

For example, the body temperature sensor 572 may be used to measure the skin temperature of a portion of the user's body. The processor 510 may obtain the user's body temperature by using the body temperature sensor 572 based on the skin temperature of the portion of the user's body.

Although not illustrated, the embodiment of the wearable device 300 is not limited to the type and/or number of one or more sensors illustrated in FIG. 5A.

For example, the sensor 570 may include an electrode sensor. The processor 510 may identify (or measure) an electrodermal activity (EDA) through the electrode sensor. The processor 510 may identify information on the tension level of the skin based on the EDA.

For example, the sensor 570 may include a heart rate variability (HRV) sensor. The processor 510 may measure the regularity or variability of the heart rate through the HRV sensor. The processor 510 may obtain information on the regularity or variability of the heart rate through the HRV sensor.

For example, the sensor 570 may include a blood sugar sensor. The processor 510 may identify the user's blood sugar level by identifying (or measuring) a current generated by an electrochemical reaction with blood sugar in the blood.

For example, the sensor 570 may further include the grip sensor that may identify contact between the wearable device 300 and the external object (e.g., the user), and/or a gyro sensor or an acceleration sensor that may identify the movement of the wearable device 300.

The processor 510 according to an embodiment may update at least one piece of information stored in the memory 520 based on identifying changes in the user's state by using sensor 570. An operation for the processor 510 to update at least one piece of information will be described later with reference to FIGS. 8A to 8B.

According to an embodiment, the display 580 of the wearable device 300 may output visualized information (e.g., a visual object 620 of FIG. 6) to the user. The number of displays 580 included in the wearable device 300 may be one or more. The display 580 may include the display 330 of FIG. 3A. For example, the display 580 may be controlled by the processor 510 and/or a graphic processing unit (GPU), and output the visualized information to the user. The display 580 may include a flat panel display (FPD) and/or electronic paper. The FPD may include a liquid crystal display (LCD), a plasma display panel (PDP), a digital mirror device (DMD), one or more light emitting diodes (LEDs), and/or a micro LED. The LED may include an organic LED (OLED). In an embodiment in which the display 580 includes the LCD, the display 580 may further include a light source (e.g., a backlight) for emitting light toward the LCD. The light source may be omitted in an embodiment in which the display 580 includes an OLED.

According to an embodiment, transmission of light may occur in at least a portion of the display 580. The wearable device 300 may provide the user experience associated with augmented reality by providing a combination of light outputted through the display 580 and light penetrated the display 580 to the user. According to an embodiment, the wearable device 300 may have a structure in which the display 580 overlaps the entire user's field-of-view (FoV) in a state worn on a user's body part such as the head. The display 580 may block ambient light of the wearable device 300 from being transmitted to the user's eyes in the state. For example, the wearable device 300 may provide the user with the user experience associated with virtual reality by using display 580.

Although not illustrated, the wearable device 300 according to an embodiment may include other output means for outputting information in a form other than a visual form or an audible form. For example, the wearable device 300 may include a motor for providing haptic feedback based on vibration. Meanwhile, although illustrated based on different blocks, the embodiment is not limited thereto, and some of the hardware components (e.g., at least some of the processor 510, the memory 520, and the communication circuit 540) illustrated in FIG. 2 may be included in a single integrated circuit such as a system on a chip (SoC).

Referring to FIG. 5B, at least one piece of information according to an embodiment may be stored in the memory 520. For example, the wearable device 300 may store information of the user equipped with the wearable device 300 and/or information of the user of the external electronic device 550 different from the wearable device 300.

For example, the wearable device 300 may store first user information 560 for the first user wearing the wearable device 300. The first user information 560 may include information on the first user logged into the wearable device 300. The first user information 560 may be uniquely assigned to the user logged into the wearable device 300. The first user information 560 may include one or more pieces of profile information 561 and 563. The one or more pieces of profile information 561 and 563 may be set by the first user and/or the wearable device 300. For example, the one or more pieces of profile information 561 and 563 may be set to be provided to a second user wearing the external electronic device 550 different from the wearable device 300. The wearable device 300 may generate second profile information 563 based on the first profile information 561. For example, in a state in which the wearable device 300 transmits the first profile information 561 to the external electronic device 550, by identifying a change in the state of the first user wearing the wearable device 300, the wearable device 300 may generate the second profile information 563. However, it is not limited thereto.

For example, each of one or more pieces of profile information 561 and 563 may be set for each category. The category may include relationship information, body information, personality information, and/or appearance information for the first user wearing the wearable device 300. For example, the relationship information may mean a relationship (e.g., family, friends, people at work, and/or black list) between the first user and the second user different from the first user. The body information may include content (e.g., whether there is plastic surgery, whether there is a tattoo, height, and/or weight) about the body of the first user. The personality information may include content about the personality and/or emotion (e.g., pleasure, depression, anger, sensitivity, and/or insensitivity) of the first user. The appearance information may include information indicating whether the first user is wearing clothes and/or accessories. However, it is not limited to the above-described embodiment. The wearable device 300 may disclose or change each piece of information included in the category according to the user corresponding to the external electronic device identified through the camera 530. For example, the second profile information 563 may be different from at least a portion of the first profile information 561.

According to an embodiment, the wearable device 300 may provide the profile information according to the user of the external electronic device identified through the camera 530. For example, the wearable device 300 may transmit the first profile information 561 to the external electronic device by using the communication circuit 540, based on identifying the external electronic device (e.g., the external electronic device 550) corresponding to the second user through the camera 530. For example, the wearable device 300 may transmit other profile information on the first user to the external electronic device corresponding to the third user by using the communication circuit 540, based on identifying the external electronic device corresponding to the third user through the camera 530.

The wearable device 300 according to an embodiment may change the one or more pieces of profile information 561 and 563 in a state in which the communication link is established by using the external electronic device 550 and the communication circuit 540. For example, the wearable device 300 may identify a change in the state of the first user wearing the wearable device 300 by using the sensor 570 in the state in which the communication link is established. Based on identifying the change in the state of the first user, the wearable device 300 may store state information indicating whether to update at least portion of the first user information 560 for transmission to the external electronic device 550.

For example, the wearable device 300 may obtain information on the second user corresponding to the external electronic device 550 based on identifying the external electronic device 550. For example, the wearable device 300 may change at least some of the first user information 560 based on identifying message information transmitted to the external electronic device corresponding to the second user and/or message information received from the external electronic device. For example, the wearable device 300 may identify or change the profile information to be transmitted to the external electronic device 550 based on the meta data for the second user.

The wearable device 300 according to an embodiment may set one or more profile information to be transmitted to the second user's external electronic device, which is different from the first user wearing the wearable device 300, based on version information. For example, the wearable device 300 may change the one or more pieces of profile information 561 and 563 based on a time table. For example, the wearable device 300 may change the one or more pieces of profile information 561 and 563 based on the number of times the external electronic device 550 is identified through the camera 530.

The wearable device 300 according to an embodiment may store the user information received from the external electronic device identified through the camera 530. For example, the user information may be stored for each user based on the user logged into the external electronic device identified through the camera. For example, the wearable device 300 may store information (e.g., second user information 590) about the second user and/or information (e.g., third user information 595) about the third user. For example, the second user and the third user may mean different users logged into different external electronic devices, respectively. For example, the wearable device 300 may receive the second user information 590 and/or the third user information 595 from at least one server. However, it is not limited thereto.

As described above, according to an embodiment, the wearable device 300 may include one or more hardware to provide the user experience based on augmented reality (AR) (or mixed reality (MR), and/or virtual reality (VR). The wearable device 300 according to an embodiment may transmit the first user information logged into the wearable device 300 to the external electronic device different from the wearable device 300. The wearable device 300 may identify one of one or more pieces of profile information included in the first user information according to the user logged into the external electronic device. For example, the wearable device 300 may transmit the first profile information corresponding to the second user logged in to the external electronic device. The wearable device 300 may selectively provide privacy of the first user by transmitting information on the first user corresponding to each of users different from the first user to each of the above. Hereinafter, an operation of updating information received by the wearable device 300 from the external electronic device 550 in FIG. 6 will be described.

Figure 6:
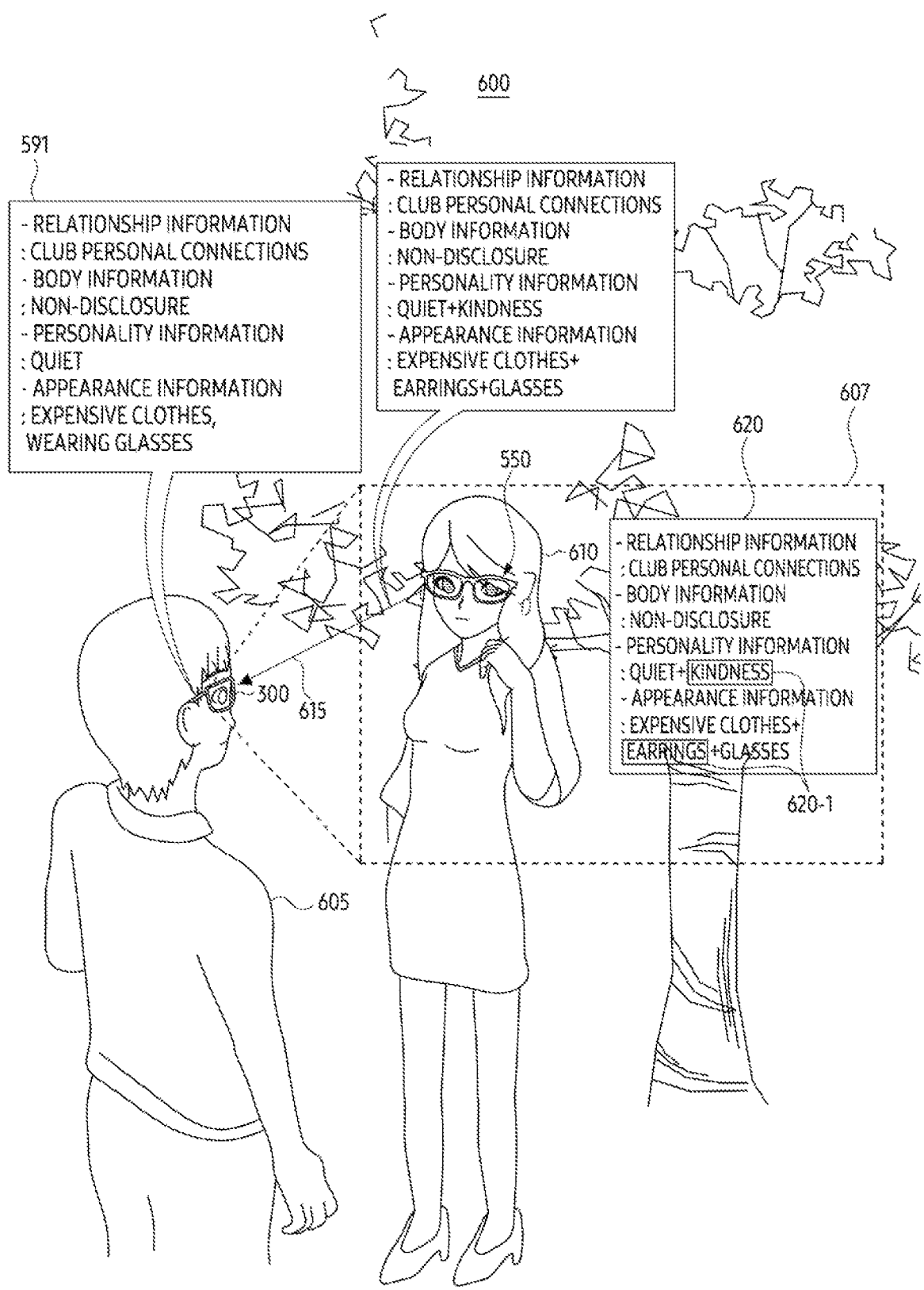
FIG. 6 illustrates a state in which a wearable device receives user information from an external electronic device according to an embodiment.

FIG. 6 illustrates a state in which a wearable device receives user information from an external electronic device according to an embodiment. A wearable device 300 of FIG. 6 may be an example of a user terminal 120 of FIG. 1 and/or the wearable device 300 of FIG. 5A.

Referring to FIG. 6, a state 600 in which the wearable device 300 according to an embodiment identifies an external electronic device 550 included in the FoV 607 is illustrated. In the state 600, an example of a field-of-view (FoV) 607 shown to a first user 605 through a display (e.g., a display 580 of FIG. 5A) of the wearable device 300 according to an embodiment is illustrated. In an embodiment of the wearable device 300 including a display configured to transmit light incident to a first surface to a second surface opposite to the first surface, the FoV 607 may be formed by the light passed through the display and transmitted to the user's both eyes.

According to an embodiment, the wearable device 300 may display a space adjacent to the wearable device 300 to the first user 605 by using the display (e.g., the display 580 of FIG. 5A). The display may be disposed to cover at least a portion of both eyes of the first user 605 in a state in which the wearable device 300 is worn by the first user 605. For example, the display may directly transmit light incident toward a second surface opposite to the first surface, to the first surface of the display disposed toward the first user 605, based on a transparent or translucent material.

For example, the wearable device 300 may indirectly transmit light incident toward the second surface to the first user 605 through the display, by displaying an image obtained by using a camera disposed on the second surface (e.g., a second surface 420 of FIG. 4B) opposite to the first surface (e.g., a first surface 410 of FIG. 4A) of the wearable device 300 disposed toward the user in a display disposed on the first surface. For example, the wearable device 300 may indirectly transmit the light through the display based on a transparent mode ("transparent mode" or "see through mode").

According to an embodiment, the wearable device 300 may allow a user wearing the wearable device 300 to recognize an external object included in the FoV 607 shown through the display. Referring to FIG. 6, as an example of the external object included in the FoV 607, a second user 610 and/or the external electronic device 550 are illustrated.

For example, the wearable device 300 may identify the external object adjacent to the FoV 607 and/or the wearable device 300 by using the camera. The external object may be referred to as a subject and/or a tangible object.

The wearable device 300 according to an embodiment may establish a communication link by using a communication circuit (e.g., a communication circuit 540 of FIG. 5A) and the external electronic device 550 in the FoV 607. For example, the wearable device 300 may identify the user (e.g., the second user 610) of the external electronic device 550 in a state in which the communication link is established. The wearable device 300 may identify second user information (e.g., a second user information 590 of FIG. 5B) stored in a memory (e.g., a memory 520 of FIG. 5), or may receive information on the second user 610 from the external electronic device 550.

According to an embodiment, the wearable device 300 may identify information of the first user 605 corresponding to the second user 610 based on identifying the second user 610 and/or the external electronic device 550. For example, the wearable device 300 may identify profile information (e.g., first profile information 561 of FIG. 5B) for the user 605 of the wearable device 300 that is browsable by the second user 610 among the information of the first user 605. An operation of the wearable device 300 to selectively transmit at least a portion of the first user information based on the user identified through the camera will be described later with reference to FIGS. 8A to 8B.

The wearable device 300 according to an embodiment may receive a signal 615 including information of the second user 610 logged into the external electronic device 550 from the external electronic device 550 in the state in which the communication link is established. For example, the information included in the signal 615 may mean information set to be browsable by the first user 605 by the external electronic device 550 and/or the second user 610. The information included in the signal 615 may mean information corresponding to the first user 605. The information included in the signal 615 may include profile information on the second user 610. For example, the information included in the signal 615 may include relationship information between the first user 605 and the second user 610, body information, personality information, and/or appearance information of the second user 610. However, it is not limited thereto.

According to an embodiment, the wearable device 300 may identify the information on the second user (e.g., third profile information 591 of FIG. 5B) stored in the memory 520. For example, the wearable device 300 may identify a difference between information included in the signal 615 received from the external electronic device 550 and the third profile information 591 for the second user 610 stored in the memory 520. For example, the information included in the signal 615 may further include information different from the third profile information 591, which is information on the second user 610.

For example, based on identifying the difference, the wearable device 300 may change (or update) the third profile information 591 based on the information included in the signal 615. For example, in case that the wearable device 300 fails to identify information on the second user stored in the memory, the information included in the signal 615 received from the external electronic device 550 may be stored in the memory 520. The information included in the signal 615 stored in the memory 520 may be referred to as the default information for the second user 610.

The wearable device 300 according to an embodiment may display a screen in the FoV 607 by using the display. For example, the screen displayed in the FoV 607 by the wearable device 300 by using the display may include information that is augmented or annotated based on the environment shown to the first user 605. For example, the wearable device 300 may display one or more visual objects (e.g., a visual object 620) by overlapping in the FoV 607 by using the display. The visual object 620 may be referred to as a virtual or imaginary object. The visual object 620 may be displayed on the display based on an application executed by the processor of the wearable device 300 (e.g., a processor 510 of FIG. 5A) and/or an input received from the user wearing the wearable device 300. The visual object 620 may include at least some of the information included in the signal 615 and/or the third profile information 391 changed based on the information. For example, the wearable device 300 may provide updated information 620-1 to the first user 605 by displaying the visual object 620 in the FoV 607.

According to an embodiment, the wearable device 300 may set the position of visual object 620 in the FoV 607 based on a 2 dimensional and/or 3 dimensional virtual space. For example, the wearable device 300 may obtain the virtual space to which the outer space of the wearable device 300 including the FoV 607 is mapped by using the camera (e.g., a camera 530 of FIG. 5A). The virtual space may be formed based on a point (e.g., a starting point) corresponding to the position of the wearable device 300. The wearable device 300 may select a portion of the display on which the visual object 620 is to be displayed based on the point of the visual object 620 in the virtual space.

The wearable device 300 according to an embodiment, although not illustrated, may display at least one visual object by overlapping the area where the external electronic device 550 and/or the second user 610 is shown in the FoV 607. For example, the at least one visual object may be an example of a visual object set by the second user 610 and/or the external electronic device 550 to represent the second user 610. For example, the at least one visual object may include a visual object such as an avatar representing the second user 610 of the external electronic device 550.

As described above, according to an embodiment, the wearable device 300 may identify the external electronic device 550 included in the FoV 607 and/or the second user 610 of the external electronic device 550. For example, the wearable device 300 may establish the communication link with the external electronic device 550 based on identifying the external electronic device 550 and/or the second user 610 of the external electronic device 550. The wearable device 300 may identify information on the second user 610 of the external electronic device 550 in the memory in the state in which the communication link is established. The wearable device 300 may receive the signal 615 including information on the second user 610 from the external electronic device 550 while identifying the information on the second user 610. The wearable device 300 may update the information on the second user 610 stored in the memory based on the information on the second user 610 included in the signal 615, and/or the information on the second user 610 stored in the memory. By displaying the updated information on the second user 610 on the FoV 607 through the display, the wearable device 300 may provide the user (e.g., the first user 605) with the latest information on the second user 610. The wearable device 300 may provide the user experience based on augmented reality by adding a virtual object (e.g., the visual object 620) that overlaps on the FoV

607 by using the display, along with a tangible object (e.g., the second user 610 of the external electronic device 550) in the FoV 607.

Figure 7:
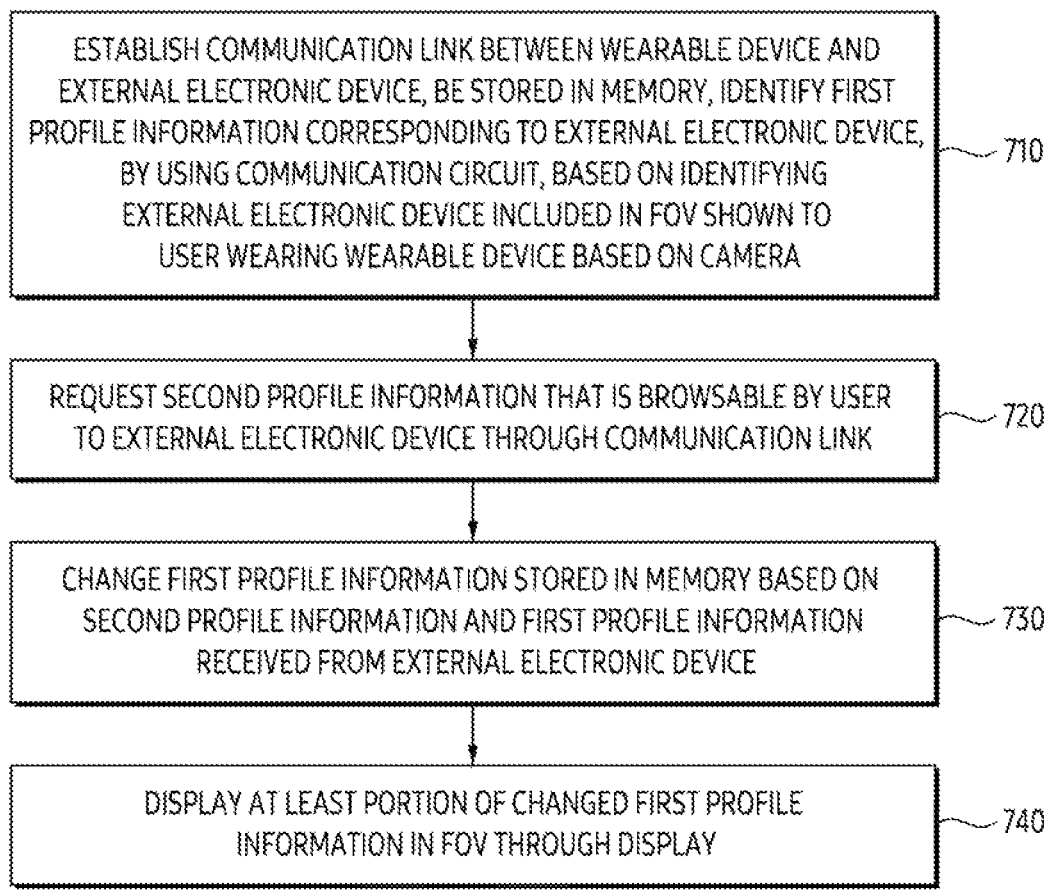
FIG. 7 is a flowchart illustrating an operation of a wearable device according to an embodiment.

FIG. 7 is a flowchart illustrating an operation of a wearable device according to an embodiment. The wearable device of FIG. 7 may be referred to a user terminal 120 of FIG. 1 and/or a wearable device 300 of FIGS. 3A to 5A. At least one of the operations of FIG. 7 may be performed by the wearable device 300 of FIG. 5A and/or a processor 510 of FIG. 5A. In the following embodiment, each operation may be performed sequentially, but is not necessarily performed sequentially. For example, the order of each operation may be changed, and at least two operations may be performed in parallel.

Referring to FIG. 7, in operation 710, the wearable device may establish a communication link between the wearable device and an external electronic device, may store it in memory, and may identify first profile information corresponding to the external electronic device, by using a communication circuit, based on identifying the external electronic device included in FoV shown to the user wearing a wearable device based on a camera. The wearable device may identify profile information (e.g., third profile information 591 of FIG. 5B) corresponding to the external electronic device and/or the user (e.g., a second user 610 of FIG. 6) of the external electronic device, in a state of establishing the communication link with the external electronic device. For example, the profile information may be information received from at least one server to the wearable device. The profile information may be information received by the wearable device from the external electronic device before establishing the communication link. For example, the wearable device may request information on the user of the external electronic device to the external electronic device. However, it is not limited thereto. For example, the wearable device may identify the user of the external electronic device by tracking the user's appearance of the external electronic device by using the camera.

Referring to FIG. 7, in operation 720, the wearable device according to an embodiment may request second profile information that is browsable by the user to an external electronic device through the communication link. For example, the user may be an example of the user (e.g., a first user 605 of FIG. 6) of the wearable device and/or the user logged into the wearable device. The second profile information may be referred to information included in a signal 615 of FIG. 6. For example, the second profile information may include information set so that the user of the external electronic device is browsable by the user of the wearable device.

Referring to FIG. 7, in operation 730, the wearable device according to an embodiment may change the first profile information stored in the memory based on the second profile information and the first profile information received from the external electronic device. For example, the wearable device may identify a difference between the second profile information and the first profile information. For example, the second profile information may include the latest information of the user of the external electronic device. The wearable device may update the first profile information based on identifying the difference.

Referring to FIG. 7, in operation 740, the wearable device according to an embodiment may display at least a portion of the changed first profile information in the FoV through the display. For example, the wearable device may display at least a portion of the changed first profile information by using a visual object (e.g., a visual object 620 of FIG. 6). The wearable device may provide the user of the wearable device with information on the external electronic device included in the FoV and/or the user of the external electronic device, based on displaying the visual object in the FoV. Hereinafter, in FIGS. 8A to 8B, an operation in which the wearable device updates information on the user logged into the wearable device based on at least one sensor will be described later.

Figure 8A:
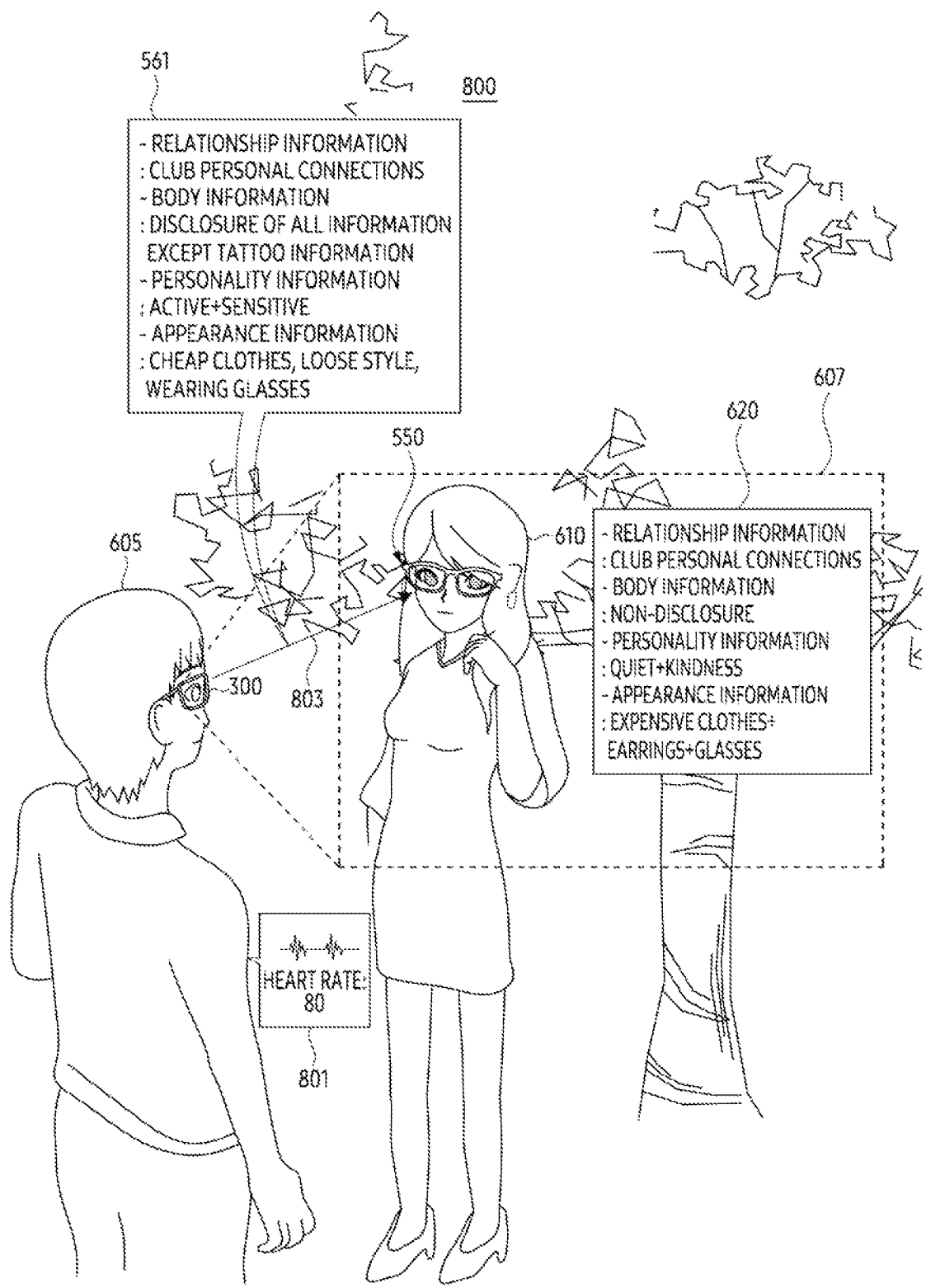
FIGS. 8A and 8B illustrate a state in which a wearable device indicates an update of user information stored in a memory according to an embodiment.
Figure 8B:
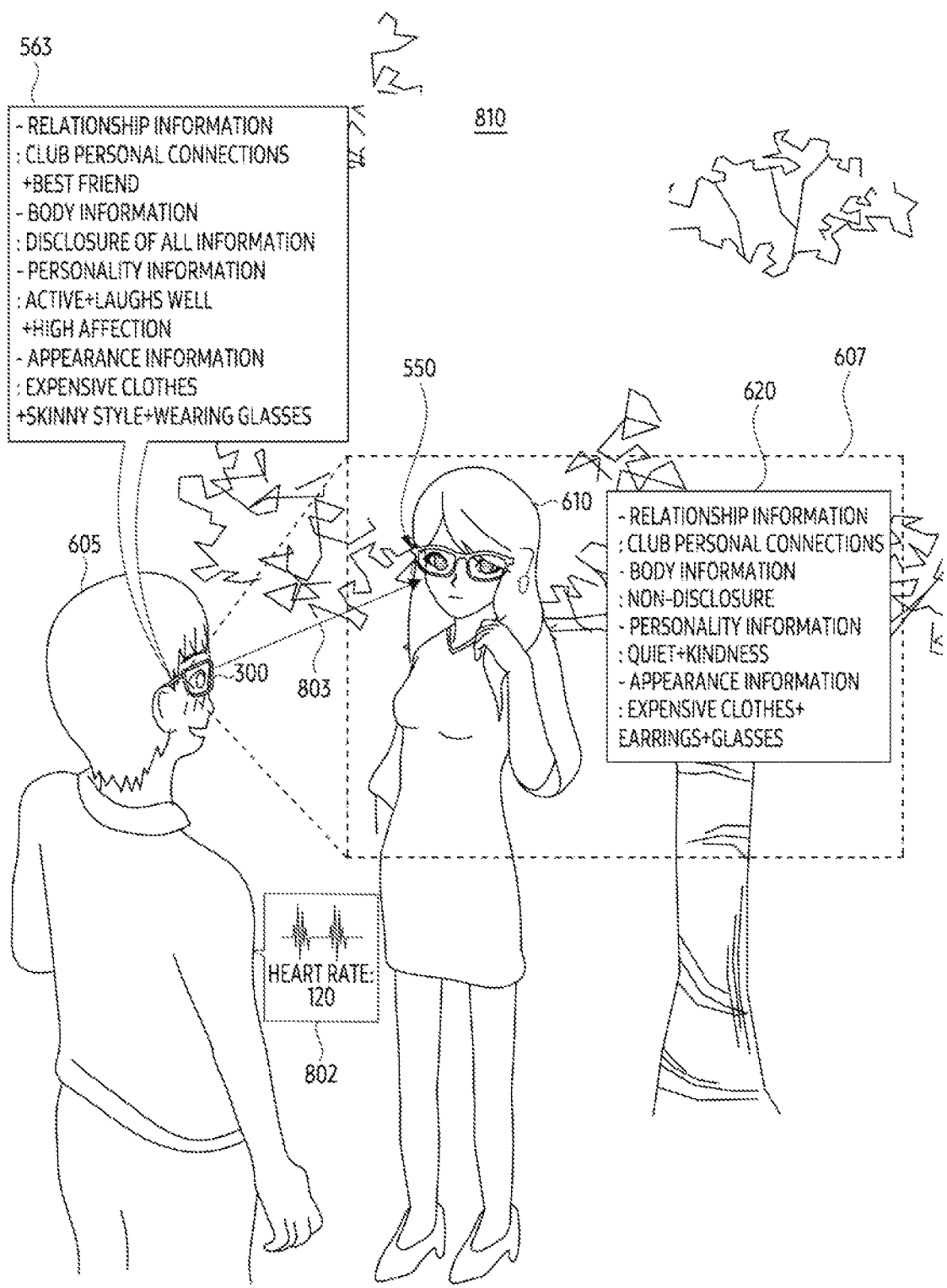

FIGS. 8A and 8B illustrate a state in which a wearable device indicates an update of user information stored in a memory according to an embodiment. A wearable device 300 of FIGS. 8A to 8B may include a user terminal 120 of FIG. 1 and/or the wearable device 300 of FIGS. 3A to 5A. For example, a state 800 may include a state 600 of FIG. 6.

Referring to FIG. 8A, while the wearable device 300 according to an embodiment establishes a communication link with the external electronic device 550, the state 800 of transmitting a signal 803 including information on the first user 605 wearing the wearable device 300 to the external electronic device 550 is illustrated.

For example, the information included in the signal 803 (e.g., a first profile information 561 of FIG. 5B) may be information corresponding to a second user 610. The information may be an example of information set to be browsable by the second user 610 by the wearable device 300. The information (e.g., the first profile information 561 of FIG. 5B) may be referred to at least one of one or more pieces of profile information 561 and 563 of FIG. 5B. For example, at least some of the information may be provided to the second user 610 by being displayed in the FoV of the external electronic device 550. For example, in case that a third user different from the second user 610 is identified in the FoV, the wearable device 300 may transmit at least portion of the information (e.g., the first user information 560 of FIG. 5B) of the first user 605 corresponding to the third user to the external electronic device of the third user. The first user 605 information corresponding to the second user 610 and the information of the first user 605 corresponding to the third user (e.g., the user corresponding to third user information 595 of FIG. 5B) may be different from each other.

The wearable device 300 according to an embodiment may identify the state of the first user 605, based on at least one sensor (e.g., a sensor 570 of FIG. 5A), in the state 800. By using a heart rate sensor 571 of FIG. 5A and/or a body temperature sensor 572 of FIG. 5A, the wearable device 300 may identify changes in the state of the first user 605 wearing the wearable device 300.

For example, the wearable device 300 may identify a heart rate 801 of the first user 605 by using a heart rate sensor (e.g., the heart rate sensor 571 of FIG. 5A). For example, the wearable device 300 may identify the body temperature of the first user 605 by using a body temperature sensor (e.g., the body temperature sensor 572 of FIG. 5A). For example, the wearable device 300 may identify changes in the state of the first user 605 by using an HRV sensor, a blood sugar sensor, and/or an electrode sensor. The wearable device may store state information indicating whether to update the first user information (e.g., the first profile information 561 of FIG. 5B) transmitted to the external electronic device 550 based on identifying the change in the state.

The wearable device 300 according to an embodiment may identify an interaction between the first user 605 and the second user 610 independently of identifying the state of the first user 605. For example, a conversation between the first user 605 and the second user 610 may be identified by using a speaker and/or a microphone included in the wearable device 300. For example, the wearable device 300 may identify message information corresponding to the second user 610 stored in the memory to support the interaction. By identifying the conversation and/or the message information, the wearable device 300 may store the state information indicating whether to change at least portion of the first user information 560 to be transmitted to the second user 610. However, it is not limited thereto. For example, the wearable device 300 may identify whether to change information corresponding to the interaction by receiving data from at least one server. For example, the wearable device 300 may obtain update information based on identifying the interaction between the first user 605 and the second user 610 based on receiving the meta data from the at least one server. The update information may include information changeable by the interaction, among the first user information 560. The wearable device 300 may store state information indicating whether to change some of the first user information 560 to be transmitted to the second user 610 based on the obtained update information.

Referring to FIG. 8B, a state 810 in which the wearable device 300 according to an embodiment identifies a change in the state of the first user 605 by using the at least one sensor (e.g., the sensor 570 of FIG. 5B) is illustrated. For example, the wearable device 300 may identify the user's body temperature which is equal to or greater than the designated threshold value by using the body temperature sensor (e.g., the body temperature sensor 572 of FIG. 5B). For example, the wearable device 300 may identify a heart rate 802 of the first user which is equal to or greater than the designated threshold value by using the heart rate sensor (e.g., the heart rate sensor 571 of FIG. 5B).

For example, the wearable device 300 may store state information indicating whether to update the information of the first user 605 (e.g., the first profile information 561 of FIG. 5B) corresponding to the second user 610 based on the heart rate 802 and/or the body temperature of the first user 605 which is equal to or greater than the designated threshold value. The wearable device 300 according to an embodiment may perform the update in response to an input indicating an update of the information of the first user 605 (e.g., the first profile information 561 of FIG. 5B) included in the signal 803, transmitted to the external electronic device 550 based on the state information. Identifying the change in the state of the first user 605 by the wearable device 300 by using data based on the at least one sensor is not limited to the above-described embodiment.

For example, the wearable device 300 may transmit the updated information of the first user 605 to the external electronic device 550 by updating the information of the first user 605 independently of storing the state information. The external electronic device 550 may display a visual object indicating the updated information of the first user 605 (e.g., second profile information 563) in the FoV of the external electronic device 550.

Based on identifying the interaction between the first user 605 and the second user 610, the wearable device 300 according to an embodiment may infer the intention of the first user 605, indicating that the first profile information (e.g., the first profile information 561 of FIG. 5A) included in the signal 803 is changed to the second profile information (e.g., the second profile information 563 of FIG. 5A). By inferring the intention of the first user 605, the wearable device may store state information indicating that the first profile information (e.g., the first profile information 561 of FIG. 5A) is changed to the second profile information (e.g., the second profile information 563 of FIG. 5A) in the memory. For example, the second profile information may include the first profile information and may further include information on the first user 605 that is browsable by the second user 610.

The wearable device 300 according to an embodiment may change at least a portion of the first user information (e.g., the first user information 560 of FIG. 5A) corresponding to the second user 610 based on identifying the change in the state of the first user 605. For example, profile information of the first user 605 corresponding to the second user 610 may be generated based on the changed at least a portion. The wearable device 300 may distinguish the generated profile information of the first user 605 based on the version information. The wearable device 300 may distinguish the profile information of the first user 605 based on the number of communication links established with the external electronic device 550. However, it is not limited thereto. For example, the wearable device 300 may perform a minor update indicating that information corresponding to the number of categories less than the threshold value among profile information of the first user 605 is changed. For example, the wearable device 300 may perform a major update indicating that information corresponding to the number of categories equal to or greater than the threshold value is changed.

For example, the wearable device 300 may provide the generated profile information of the first user 605 to the first user 605 after the communication link established with the external electronic device 550 is released. After the communication link is released, the wearable device 300 may provide (or display) the generated profile information of the first user 605 to the first user 605. For example, the generated profile information of the first user 605 may further include private information on the first user 605 by changing at least a portion of the first user information corresponding to the second user 610 based on the fact that the wearable device 300 identifies the change in the state of the first user 605 for the second user 610. The wearable device 300 may receive from the first user 605, an input for adjusting the disclosure of the private information on the first user by providing the generated profile information of the first user 605. The wearable device 300 may guide the change in the disclosure of the private information on the first user by displaying the generated profile information of the first user 605 by controlling a display.

As described above, the wearable device 300 according to an embodiment may transmit information on the first user 605 logged into a different wearable device 300 according to the external electronic device and/or the user, in the FoV 607. The wearable device 300 may protect the privacy of the first user 605 by transmitting different information on the first user 605 according to the external electronic device and/or the user.

For example, the wearable device 300 may monitor the interaction between the first user 605 and the second user 610 in a state in which the communication link is established with the external electronic device 550. The wearable device 300 may infer a change in the relationship between the first user 605 and the second user 610 by monitoring the interaction. By inferring the change in the relationship, the wearable device 300 may update the information of the first user 605 to be provided to the second user 610. The updated information of the first user 605 may be generated by the wearable device 300 based on the version information. The updated information of the first user 605 may be transmitted to the external electronic device 550. The wearable device 300 may protect the privacy of the first user 605 by generating the profile information of the first user 605 that is different from the first user 605 and corresponds to each of the users.

Figure 9:
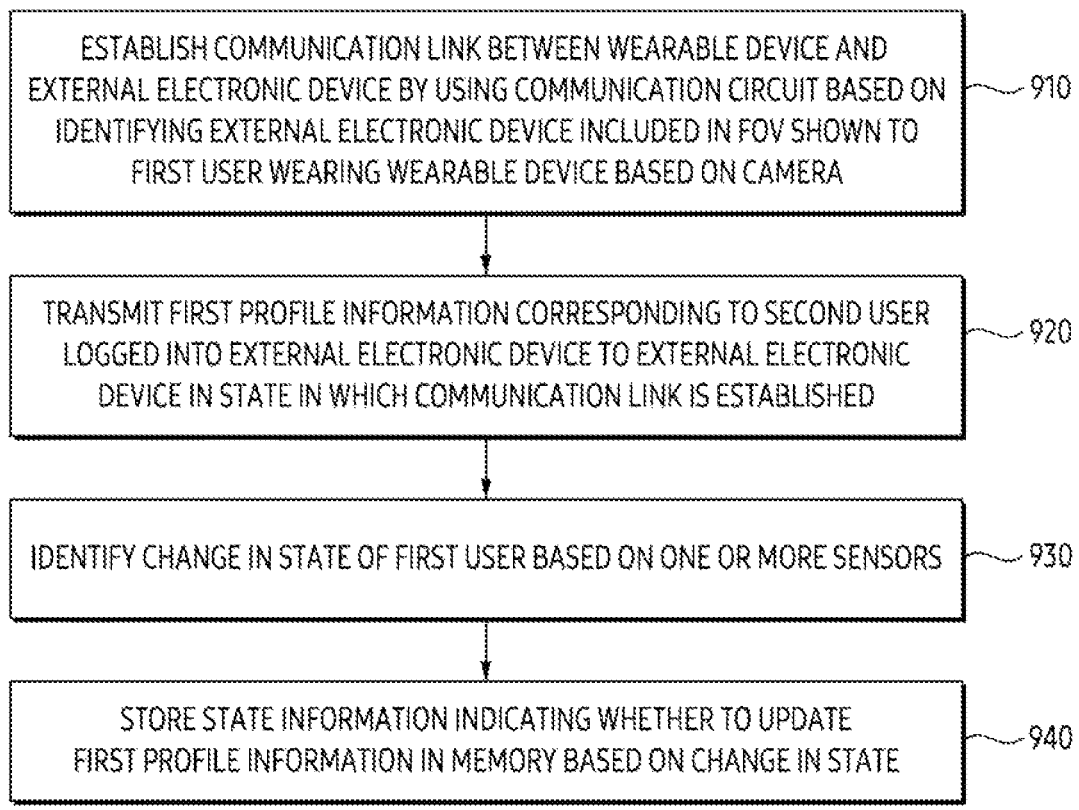
FIG. 9 is a flowchart illustrating an operation of a wearable device according to an embodiment.

FIG. 9 is a flowchart illustrating an operation of a wearable device according to an embodiment. The wearable device of FIG. 9 may be referred to a user terminal 120 of FIG. 1 and/or a wearable device 300 of FIGS. 3A to 5A. At least one of the operations of FIG. 9 may be performed by the wearable device 300 of FIG. 5A and/or a processor 510 of FIG. 5A. In the following embodiment, each operation may be performed sequentially, but is not necessarily performed sequentially. For example, the order of each operation may be changed, and at least two operations may be performed in parallel.

Referring to FIG. 9, in operation 910, the wearable device according to an embodiment may establish a communication link between the wearable device and an external electronic device by using a communication circuit based on identifying the external electronic device included in a FoV shown to a first user wearing the wearable device based on the camera. For example, the first user may be referred to a first user 605 of FIG. 6. The FoV may be referred to a FoV 607 of FIG. 6. The external electronic device may be referred to an external electronic device 550 of FIG. 5A.

Referring to FIG. 9, in operation 920, the wearable device according to an embodiment may transmit first profile information corresponding to a second user logged into the external electronic device to the external electronic device in a state in which the communication link is established. For example, the first profile information may include information on the first user of the wearable device set to be browsable by the second user (e.g., the second user 610 of FIG. 6). For example, the wearable device may request or receive information on the second user corresponding to the first user from the external electronic device while transmitting first profile information. The information on the second user may be an example of profile information on the second user, which is set to be browsable by the first user.

Referring to FIG. 9, in operation 930, the wearable device according to an embodiment may identify a change in a state of the first user based on one or more sensors. For example, the one or more sensors may be referred to a sensor 570 of FIG. 5A. For example, the wearable device may identify the change in the state of the first user based on identifying a heart rate, body temperature, and/or tension level of the first user by using the one or more sensors. However, it is not limited thereto. For example, the wearable device may identify an interaction between the first user and the second user. The interaction may be identified based on the conversation content and/or message information between the first user and the second user. The wearable device may identify the change in the state based on identifying the interaction.

Referring to FIG. 9, in operation 940, the wearable device according to an embodiment may store state information indicating whether to update the first profile information in a memory based on the change in the state. For example, the wearable device may determine whether to update the first profile information transmitted to the external electronic device based on identifying the heart rate and/or the body temperature which is equal to or greater than a designated threshold value. For example, the wearable device may generate second profile information, which is associated with the first profile information and further includes information on the first user, based on identifying the heart rate, and/or the body temperature which is equal to or greater than the designated threshold value. For example, the second profile information may further include the latest information between the first user and the second user. For example, the wearable device may provide the first user with state information indicating whether the first profile information is updated or not, based on the state information. For example, an operation in which the wearable device provides state information indicating whether or not to update the first profile information to the first user in a state in which the communication link is released will be described later in FIG. 10.

Figure 10:
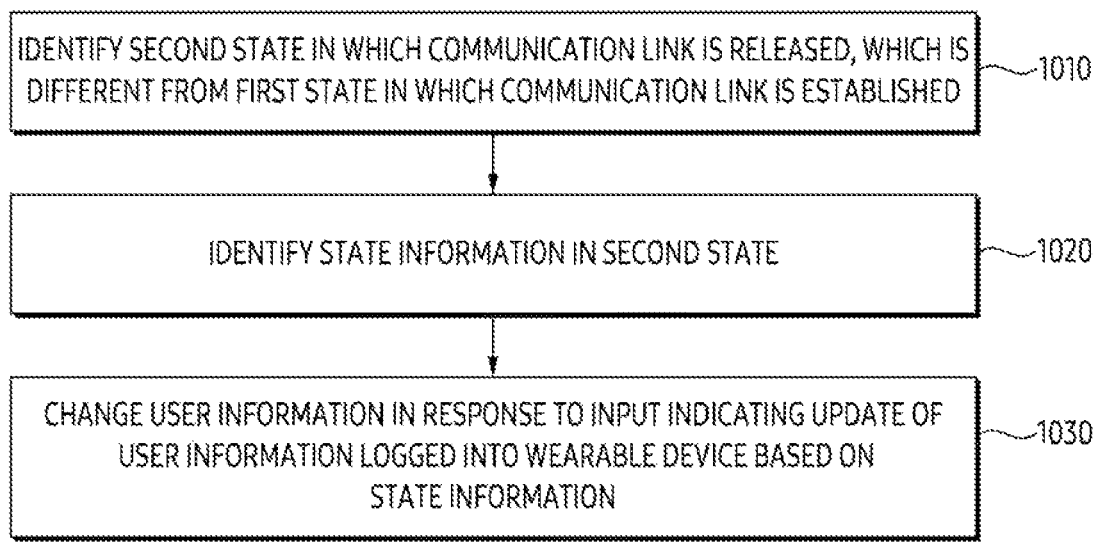
FIG. 10 is a flowchart illustrating an operation of a wearable device according to an embodiment.

FIG. 10 is a flowchart illustrating an operation of a wearable device according to an embodiment. The wearable device of FIG. 10 may be referred to a user terminal 120 of FIG. 1 and/or a wearable device 300 of FIGS. 3A to 5A. At least one of the operations of FIG. 10 may be performed by the wearable device 300 of FIG. 5A and/or a processor 510 of FIG. 5A. In the following embodiment, each operation may be performed sequentially, but is not necessarily performed sequentially. For example, the order of each operation may be changed, and at least two operations may be performed in parallel.

Referring to FIG. 10, in operation 1010, the wearable device according to an embodiment may identify a second state in which the communication link is released, which is different from the first state in which the communication link is established. For example, the first state may be referred to a state 810 of FIG. 8B. For example, in case that an external electronic device (e.g., an external electronic device 550 of FIG. 5A) is not identified in the FoV of the wearable device (e.g., a FoV 607 of FIG. 6), the wearable device may release the communication link established with the external electronic device.

Referring to FIG. 10, in operation 1020, the wearable device according to an embodiment may identify state information in the second state. For example, the wearable device may store the state information based on identifying a change in a state of a first user (e.g., a first user 605 of FIG. 6) of the wearable device in the first state. For example, the state information may include information indicating whether to update first profile information (e.g., a first profile information 561 of FIG. 5B) transmitted to the external electronic device (e.g., the external electronic device 550 of FIG. 5A). For example, the state information may include information based on interactions between the first user and the second user in the first state. For example, the state information may include the latest information between the first user and the second user. For example, the state information may mean second profile information (e.g., second profile information 563 of FIG. 5B) in which information that is not disclosed in the first profile information (e.g., the first profile information 561 of FIG. 5B) is disclosed. By providing the state information to the first user (e.g., the first user 605 of FIG. 6) in the second state, the wearable device may protect the privacy of the first user rather than transmitting the state information to the external electronic device in the first state.

Figure 11:
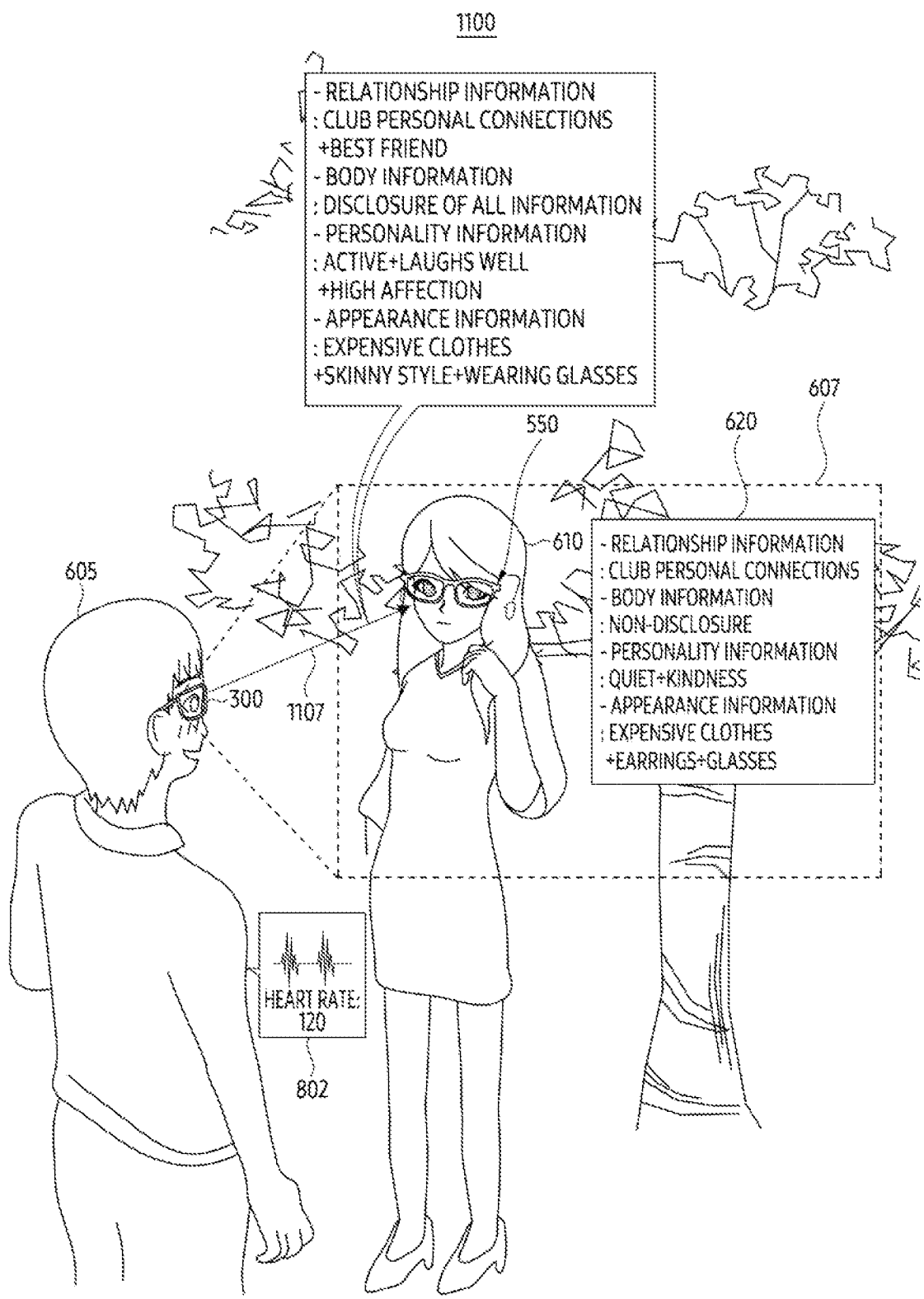
FIG. 11 illustrates a state in which a wearable device and an external electronic device exchange information according to an embodiment.

Referring to FIG. 10, in operation 1030, the wearable device according to an embodiment may change the user information in response to an input indicating an update of the user information logged into the wearable device based on the state information. For example, the user information may be referred to the first profile information (e.g., the first profile information 561 of FIG. 5B) transmitted by the wearable device to the external electronic device (e.g., the external electronic device 550 of FIG. 5B). For example, the wearable device may display a visual object indicating the state information in the second state, in the FoV. The wearable device may receive an input indicating that the visual object is selected from a user (e.g., the first user 605 of FIG. 6) logged into the wearable device. For example, the wearable device may distinguish and store the updated user information based on version information. The wearable device may distinguish and store the user information based on a time table. However, it is not limited thereto. The wearable device may transmit the updated user information to the external electronic device in the first state different from the second state. In FIG. 11, an operation in which the wearable device transmits the updated user information to the external electronic device will be described later.

FIG. 11 illustrates a state in which a wearable device and an external electronic device exchange information according to an embodiment. A wearable device 300 of FIG. 11 may include a user terminal 120 of FIG. 1 and/or the wearable device 300 of FIG. 3A to FIG. 5A. A state 1100 of FIG. 11 may mean a state in which an external electronic device 550 is identified in a FoV 607 of the wearable device 300 after a state 810 of FIG. 8B. The state 1100 of FIG. 11 may include a state in which user information is updated by a first user 605 of the wearable device 300 in operation 1030 of FIG. 10.

According to an embodiment, the wearable device 300 may identify the external electronic device 550 included in the FoV 607 and/or a second user 610. The wearable device 300 may establish a communication link with the external electronic device 550 using a communication circuit (e.g., a communication circuit 540 of FIG. 5A) based on identifying the external electronic device 550 and/or the second user 610. In the state of establishing the communication link, the wearable device 300 may identify first user information (e.g., first user information 560 of FIG. 5B) corresponding to the second user 610 in a memory (e.g., a memory 520 of FIG. 5A). For example, the first user information may mean other information different from information included in a transmitted signal (e.g., a signal 803 of FIG. 8B) in a state 800 of FIG. 8B. For example, the other information may mean information obtained by updating information included in the signal. For example, the first user information may be referred to second profile information 563 of FIG. 5B. For example, the wearable device 300 may transmit a signal 1107 including the identified first user information to the external electronic device 550. For example, the external electronic device 550 may display a visual object indicating the first user information in the FoV of the external electronic device 550.

According to an embodiment, the wearable device 300 may request or receive information on the second user 610 corresponding to the first user 605 from the external electronic device 550. The wearable device 300 may determine whether to update the information on the second user 610 received from the external electronic device 550. For example, the information on the second user 610 may substantially match the information on the second user 610 stored in the memory. The wearable device 300 may temporarily refrain from updating the information on the second user 610 stored in the memory, based on identifying substantially coincidence between the information on the second user 610 received from the external electronic device 550 and the information on the second user 610 stored in the memory. The wearable device 300 may display a visual object 620 indicating the information on the second user 610 received from the external electronic device 550 in the FoV 607.

For example, based on identifying an inconsistency between the information on the second user 610 received from the external electronic device 550 and the information on the second user 610 stored in the memory, the wearable device 300 may update information on the second user 610 stored in the memory. The wearable device 300 may display a visual object indicating the updated information in the FoV 607. The visual object may include information different from the information included in the visual object 620. However, it is not limited to the above-described embodiment.

As described above, the wearable device 300 may transmit various profile information (e.g., one or more profile information included in the first user information 560 of FIG. 5B) of the first user 605 logged into the wearable device 300 differently according to the external electronic device and/or the user identified in the FoV 607 of the wearable device 300. The wearable device 300 may relatively safely protect the privacy of the first user 605 by generating profile information of the first user 605 according to users different from the first user 605.

According to an embodiment, the wearable device may transmit at least a portion of information on the user wearing the wearable device to an external electronic device. In order for the wearable device to protect information about the user, a method for transmitting information about the user corresponding to the external electronic device may be required.

As described above, a wearable device 300 according to an embodiment may comprise a communication circuit 540, a memory 520 storing at least one instruction, a camera 530, a display 580 and at least one processor 510. The at least one processor may be configured to execute the at least one instruction to establish, through the communication circuit, a communication link between the wearable device and an external electronic device, based on identifying the external electronic device in a field-of-view (FoV) corresponding to the camera and shown to a user wearing the wearable device. The at least one processor may be configured to execute the at least one instruction to identify first profile information corresponding to the external electronic device. The at least one processor may be configured to execute the at least one instruction to request, via the communication link, second profile information that is browsable by the user, from the external electronic device. The at least one processor may be configured to execute the at least one instruction to change the first profile information based on the first profile information and the second profile information received from the external electronic device. The at least one processor may be configured to execute the at least one instruction to display, through the display, at least a portion of the changed first profile information in the FoV.

For example, the wearable device may further comprise one or more sensors 570. The at least one processor may be configured to execute the at least one instruction to transmit, to the external electronic device, third profile information corresponding to the user, based on a first state of the external electronic device in which the communication link is established. The at least one processor may be configured to execute the at least one instruction to identify a change in a state of the user, based on the one or more sensors. The at least one processor may be configured to execute the at least one instruction to store, in the memory, state information indicating whether to update the first profile information to the third profile information, based on the change in the state of the user.

For example, the at least one processor may be configured to execute the at least one instruction to, based on an input indicating an update of the third profile information, change the third profile information based on the state information and a second state of the external electronic device in which the communication link is released.

For example, the at least one processor may be configured to execute the at least one instruction to establish the communication link, based on identifying the external electronic device included in the FoV, in the second state. The at least one processor may be configured to execute the at least one instruction to transmit, the changed third profile information, to the external electronic device.

For example, the one or more sensors may comprise a heart rate sensor 571 and a body temperature sensor 572. The at least one processor may be configured to execute the at least one instruction to may identify body temperature of the user, which is equal to or greater than a first threshold value, using the body temperature sensor. The processor, while identifying the body temperature of the user, may identify heart rate of the user 801; 802, which is equal to or greater than a second threshold, using the heart rate sensor. The processor may be configured to identify the change in the state of the user, based on at least one of the body temperature of the user or the heart rate of the user.

For example, the user may be a first user 605. The at least one processor may be configured to execute the at least one instruction to transmit the third profile information corresponding to a second user 610 logged in to the external electronic device.

For example, the user may be a first user 605. the first profile information may include information on a second user logged in to the external electronic device. The at least one processor may be configured to execute the at least one instruction to identify at least one of personality information, body information, appearance information, or relationship information between the first user and the second user, based on the first profile information.

For example, the second profile information may comprise the first profile information and information on the second user browsable by the first user.

For example, the at least one processor may be configured to execute the at least one instruction to request the second profile information corresponding to the user, to the external electronic device.

For example, the at least one processor may be configured to execute the at least one instruction to display at least a portion of the changed first profile information in the FoV, through the display, by overlapping the wearable device.

As described above, a method of the wearable device 300 according to an embodiment may comprise establishing, through the communication circuit, a communication link between the wearable device and an external electronic device 550, based on identifying the external electronic device in a field-of-view (FoV) 607 corresponding to a camera of the wearable device and shown to a first user 605 wearing the wearable device. The method may comprise transmitting, to the external electronic device, first profile information 561 corresponding to a second user 610 logged in to the external electronic device, based on a first state of the wearable device in which the communication link is established. The method may comprise identifying 930 a change in a state of the first user, based on one or more sensors 570. The method may comprise storing in a memory 520, state information indicating whether to update the first profile information, based on the change in the state of first user.

For example, the method may comprise identifying second profile information 591 corresponding to the external electronic device. The method may comprise requesting third profile information browsable by the first user to the external electronic device. The method may comprise changing the second profile information, based on the third profile information received from the external electronic device and the second profile information. The method may comprise displaying at least a portion of the changed second profile information in the FoV through the display.

For example, the one or more sensors may comprise a heart rate sensor 571 and a body temperature sensor 572. The method may comprise identifying body temperature of the first user, which is equal to or greater than a first threshold value, using the body temperature sensor. The method may comprise, while identifying the body temperature of the first user, identifying a heart rate of the user 801; 802, which is equal to or greater than a second threshold, using the heart rate sensor. The method may comprise identifying the change in the state of the first user, based on at least one of the body temperature of the user or the heart rate of the first user.

For example, the state in which the communication link is established may be a first state. The method may comprise changing the first profile information, in response to an input indicating an update of the first profile information, based on the state information, in a second state of wearable device in which the communication link is released.

For example, the method may comprise establishing the communication link, based on identifying the external electronic device included in the FoV, in the second state. For example, the method may comprise transmitting, the changed first profile information, to external electronic device.

As described above, a wearable device 300 according to an embodiment may include a communication circuit 540, one or more sensors 570, a memory 520 storing at least one instruction, a camera 530, a display 580 and a processor 510. The at least one processor may be configured to execute the at least one instruction to establish, through the communication circuit, a communication link between the wearable device and an external electronic device, based on identifying the external electronic device in a field-of-view (FoV) corresponding to the camera and shown to a first user wearing the wearable device. The at least one processor may be configured to execute the at least one instruction to transmit, to the external electronic device, first profile information corresponding to a second user logged in to the external electronic device, based on a first state of the wearable device in which the communication link is established. The at least one processor may be configured to execute the at least one instruction to identify a change in the state of the first user, based on the one or more sensors. The at least one processor may be configured to execute the at least one instruction to store, in the memory, state information indicating whether to update the first profile information based on the change in the state of the first user.

For example, the at least one processor may be configured to execute the at least one instruction to identify second profile information 591 corresponding to the external electronic device. The at least one processor may be configured to execute the at least one instruction to request third profile information browsable by the first user to the external electronic device. The at least one processor may be configured to execute the at least one instruction to change the second profile information, based on the third profile information received from the external electronic device and the second profile information. The at least one processor may be configured to execute the at least one instruction to display at least a portion of the changed second profile information in the FoV through the display.

For example, the one or more sensors may comprise a heart rate sensor 571 and a body temperature sensor 572. The at least one processor may be configured to execute the at least one instruction to identify a body temperature of the first user, which is equal to or greater than a first threshold value, using the body temperature sensor. While identifying the body temperature of the first user, the at least one processor may be configured to execute the at least one instruction to identify heart rate of the user 801; 802, which is equal to or greater than a second threshold, using the heart rate sensor. The at least one processor may be configured to execute the at least one instruction to identify the change in the state of the first user, based on at least one of the body temperature of the first user or the heart rate of the first user.

For example, The at least one processor may be configured to execute the at least one instruction to change the first profile information, in response to an input indicating an update of the first profile information, based on the state information, in a second state of wearable device in which the communication link is released.

For example, the at least one processor may be configured to execute the at least one instruction to establish the communication link, based on identifying the external electronic device included in the FoV, in the second state. The at least one processor may be configured to execute the at least one instruction to transmit, the changed first profile information, to external electronic device.

As described above, a method of the wearable device 300 according to an embodiment may comprise establishing communication link between the wearable device and an external electronic device 550, by using a communication circuit 540, based on identifying the external electronic device included in a field-of-view (FoV) 607 shown to a first user 605 wearing the wearable device based on a camera 530, being stored in the memory 520, and identifying first profile information 561 corresponding to the external electronic device. The method may comprise requesting second profile information that is browsable by the user, to the external electronic device through the communication link. The method may comprise changing the first profile information stored in the memory based on the first profile information and the second profile information received from the external electronic device. The method may comprise displaying at least a portion of the changed first profile information in the FoV through the display 580.

For example, the wearable device may include one or more sensors 570. The method may comprise transmitting third profile information 561 corresponding to the user, to the external electronic device, in a state in which the communication link is established. The method may comprise identifying a change in the user's state, based on the one or more sensors. The method may comprise storing state information indicating whether to update to the third profile information, based on the change in the user's state, in the memory.

For example, the method may comprise changing the third profile information, in response to an input indicating an update of the third profile information, based on the state information, in a second state in which the communication link is released, which is different from the first state in which the communication link is established.

For example, the method may comprise establishing the communication link, based on identifying the external electronic device included in the FoV, in the second state. The processor may comprise transmitting, the changed third profile information, to external electronic device.

For example, the one or more sensors may include a heart rate sensor 571 and a body temperature sensor 572. The method may comprise identifying body temperature of the user, which is equal to or greater than a first threshold value, using the body temperature sensor. The method, while identifying the body temperature of the user, may comprise identifying heart rate of the user 801; 802, which is equal to or greater than a second threshold, using the heart rate sensor. The method may comprise identifying the change in the state of the user, based on at least one of the body temperature of the user or the heart rate of the user.

For example, the method may comprise transmitting the third profile information corresponding to a second user 610 logged in to the external electronic device, which is different from the first user, which is the user.

For example, the first profile information may include information on a second user logged in to the external electronic device, different from the first user, which is the user. The method may comprise identifying at least one information of personality information, body information, appearance information of the second user, or relationship information between the first user and the second user, from the first profile information.

For example, the method may comprise identifying the second profile information, which further includes the first profile information and information on the second user browsable by the first user.

For example, the method may comprise requesting the second profile information corresponding to the user, to the external electronic device.

For example, the method may comprise displaying at least a portion of the changed first profile information in the FoV, through the display, by overlapping the wearable device.

The apparatus described above may be implemented as a combination of hardware components, software components, and/or hardware components and software components. For example, the devices and components described in the embodiments may be implemented using one or more general purpose computers or special purpose computers such as processors, controllers, arithmetical logic unit (ALU), digital signal processor, microcomputers, field programmable gate array (FPGA), PLU (programmable logic unit), microprocessor, any other device capable of executing and responding to instructions. The processing device may perform an operating system OS and one or more software applications performed on the operating system. In addition, the processing device may access, store, manipulate, process, and generate data in response to execution of the software. For convenience of understanding, although one processing device may be described as being used, a person skilled in the art may see that the processing device may include a plurality of processing elements and/or a plurality of types of processing elements. For example, the processing device may include a plurality of processors or one processor and one controller. In addition, other processing configurations, such as a parallel processor, are also possible.

The software may include a computer program, code, instruction, or a combination of one or more of them and configure the processing device to operate as desired or command the processing device independently or in combination. Software and/or data may be embodied in any type of machine, component, physical device, computer storage medium, or device to be interpreted by a processing device or to provide instructions or data to the processing device. The software may be distributed on a networked computer system and stored or executed in a distributed manner. Software and data may be stored in one or more computer-readable recording media.

The method according to the embodiment may be implemented in the form of program instructions that may be performed through various computer means and recorded in a non-transitory computer-readable medium. In this case, the medium may continuously store a computer-executable program or temporarily store the program for execution or download. In addition, the medium may be a variety of recording means or storage means in which a single or several hardware are combined and is not limited to media directly connected to any computer system and may be distributed on the network. Examples of media may include magnetic media such as hard disks, floppy disks and magnetic tapes, optical recording media such as CD-ROMs and DVDs, magneto-optical media such as floppy disks, ROMs, RAMs, flash memories, and the like to store program instructions. Examples of other media include app stores that distribute applications, sites that supply or distribute various software, and recording media or storage media managed by servers.

Although embodiments have been described according to limited embodiments and drawings as above, various modifications and modifications are possible from the above description to those of ordinary skill in the art. For example, even if the described techniques are performed in a different order from the described method, and/or components such as the described system, structure, device, circuit, etc. are combined or combined in a different form from the described method or are substituted or substituted by other components or equivalents, appropriate results may be achieved.

Therefore, other implementations, other embodiments, and equivalents to the claims fall within the scope of the claims to be described later.

What is claimed is:

1. A wearable device comprising:
   communication circuitry;
   memory storing one or more instructions;
   one or more sensors;
   a camera;
   a display; and
   at least one processor operatively coupled to the memory;
   wherein the one or more instructions, when executed by the at least one processor, cause the wearable device to:
      establish, through the communication circuitry, a communication link between the wearable device and an external electronic device, based on identifying the external electronic device in a field-of-view (FoV) corresponding to the camera and shown to a user wearing the wearable device,
      identify first profile information corresponding to the external electronic device,
      request, via the communication link, second profile information that is browsable by the user and updated based on a change in a state of another user of the external electronic device, from the external electronic device,
      change the first profile information based on the first profile information and the second profile information received from the external electronic device, and
      display, through the display, at least a portion of the changed first profile information in the FoV,
      transmit, to the external electronic device, third profile information corresponding to the user, based on a first state of the external electronic device in which the communication link is established,
      identify a change in a state of the user, based on the sensors, and
      store, in the memory, state information indicating whether to update the first profile information to the third profile information, based on the change in the state of the user, and
      based on an input indicating an update of the third profile information, change the third profile inform on based on the state information and a second state of the external electronic device in which the communication link is released.

2. The wearable device of claim 1, wherein the one or more instructions, when executed by the at least one processor, cause the wearable device to:
   establish the communication link, based on identifying the external electronic device included in the FoV, in the second state; and
   transmit, the changed third profile information, to the external electronic device.

3. The wearable device of claim 1, wherein the one or more sensors comprise a heart rate sensor and a body temperature sensor, and
   wherein the one or more instructions, when executed by the at least one processor, cause the wearable device to:
      identify, using the body temperature sensor, a body temperature of the user which is equal to or greater than a first threshold value,
      while identifying the body temperature of the user, identify, using the heart rate sensor, a heart rate of the user which is equal to or greater than a second threshold, and
      identify the change in the state of the user, based on at least one of the body temperature of the user or the heart rate of the user.

4. The wearable device of claim 1, wherein the user is a first user,
   wherein the one or more instructions, when executed by the at least one processor, cause the wearable device to:
      transmit the third profile information corresponding to a second user logged in to the external electronic device.

5. The wearable device of claim 1, wherein the user is a first user, and the first profile information includes information on a second user logged in to the external electronic device, and
   wherein the one or more instructions, when executed by the at least one processor, cause the wearable device to:
      identify at least one of personality information, body information, appearance information, or relationship information between the first user and the second user, based on the first profile information.

6. The wearable device of claim 5, wherein the second profile information comprises the first profile information and information on the second user browsable by the first user.

7. The wearable device of claim 1, wherein the one or more instructions, when executed by the at least one processor, cause the wearable device to:
   request the second profile information corresponding to the user, to the external electronic device.

8. The wearable device of claim 7, wherein the one or more instructions, when executed by the at least one processor, cause the wearable device to:
   display at least a portion of the changed first profile information in the FoV, through the display, by overlapping the wearable device.

9. A method of a wearable device comprising:
establishing a communication link between the wearable device and an external electronic device based on identifying the external electronic device in a field-of-view (FoV) corresponding to a camera of the wearable device and shown to a first user wearing the wearable device;
transmitting, to the external electronic device, first profile information corresponding to a second user logged in to the external electronic device, based on a first state of the wearable device in which the communication link is established;
identifying a change in a state of the first user, based on one or more sensors of the wearable device; and
storing, in memory, state information indicating whether to update the first profile information, based on the change in the state of the first user; and
changing the first profile information, in response to an input indicating an update of the first profile information, based on the state information, in a second state of the wearable device in which the communication link is released.

10. The method of claim 9, comprising:
identifying second profile information corresponding to the external electronic device,
requesting third profile information browsable by the first user to the external electronic device,
changing the second profile information, based on the third profile information received from the external electronic device and the second profile information; and
displaying at least a portion of the changed second profile information in the FoV through a display of the wearable device.

11. The method of claim 10, wherein the one or more sensors comprise a heart rate sensor and a body temperature sensor, the method comprising:
identifying a body temperature of the first user, which is equal to or greater than a first threshold value, using the body temperature sensor;
while identifying the body temperature of the first user, identifying a heart rate of the first user, which is equal to or greater than a second threshold, using the heart rate sensor; and
identifying the change in the state of the first user, based on at least one of the body temperature of the first user or the heart rate of the first user.

12. The method of claim 9, comprising:
establishing the communication link, based on identifying the external electronic device included in the FoV, in the second state; and
transmitting, the changed first profile information, to the external electronic device.

13. A wearable device comprising:
communication circuitry;
one or more sensors;
memory storing one or more instructions;
a camera;
a display; and
at least one processor operatively coupled to the memory,
wherein the one or more instructions, when executed by the at least one processor, cause the wearable device to:
establish, through the communication circuitry, a communication link between the wearable device and an external electronic device, based on identifying the external electronic device in a field-of-view (FoV) corresponding to the camera and shown to a first user wearing the wearable device,
transmit, to the external electronic device, first profile information corresponding to a second user logged in to the external electronic device based on a first state of the wearable device in which the communication link is established,
identify a change in a state of the first user, based on the one or more sensors,
store, in the memory, state information indicating whether to update the first profile information based on the change in the state of the first user, and
change the first profile information, in response to an input indicating an update of the first profile information, based on the state information, in a second state of the wearable device in which the communication link is released.

14. The wearable device of claim 13, wherein the one or more instructions, when executed by the at least one processor, cause the wearable device to:
identify second profile information corresponding to the external electronic device;
request third profile information browsable by the first user to the external electronic device;
change the second profile information, based on the third profile information received from the external electronic device and the second profile information; and
display at least a portion of the changed second profile information in the FoV through the display.

15. The wearable device of claim 14,
wherein the one or more sensors comprise a heart rate sensor and a body temperature sensor, and
wherein the one or more instructions, when executed by the at least one processor, cause the wearable device to:
identify a body temperature of the first user, which is equal to or greater than a first threshold value, using the body temperature sensor,
while identifying the body temperature of the first user, identify a heart rate of the first user which is equal to or greater than a second threshold, using the heart rate sensor, and
identify the change in the state of the first user, based on at least one of the body temperature of the first user or the heart rate of the first user.

16. The wearable device of claim 13, wherein the one or more instructions, when executed by the at least one processor, cause the wearable device to:
establish the communication link, based on identifying the external electronic device included in the FoV, in the second state; and
transmit, the changed first profile information, to the external electronic device.

* * * * *